US012758875B2

(12) United States Patent
Wei et al.

(10) Patent No.: US 12,758,875 B2
(45) Date of Patent: Oct. 13, 2026

(54) VIRTUAL OBJECT CONTROL METHOD AND APPARATUS, DEVICE, AND MEDIUM

(71) Applicant: Tencent Technology (Shenzhen) Company Limited, Shenzhen (CN)

(72) Inventors: Jiacheng Wei, Shenzhen (CN); Xun Hu, Shenzhen (CN); Shandong Su, Shenzhen (CN); Jiang Yan, Shenzhen (CN); Kang Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1219 days.

(21) Appl. No.: 17/501,537

(22) Filed: Oct. 14, 2021

(65) Prior Publication Data

US 2022/0032191 A1 Feb. 3, 2022

Related U.S. Application Data

(63) Continuation of application No. PCT/CN2021/083656, filed on Mar. 29, 2021.

(30) Foreign Application Priority Data

May 15, 2020 (CN) ......................... 202010412006.5

(51) Int. Cl.
*A63F 13/533* (2014.01)
*A63F 13/52* (2014.01)
(Continued)

(52) U.S. Cl.
CPC ............ *A63F 13/533* (2014.09); *A63F 13/52* (2014.09); *A63F 13/5372* (2014.09);
(Continued)

(58) Field of Classification Search
CPC . A63F 13/525; A63F 13/5252; A63F 13/2145
See application file for complete search history.

(56) References Cited

U.S. PATENT DOCUMENTS 9,460,543 B2 10/2016 Huang
10,152,818 B2 12/2018 Huang
(Continued)

FOREIGN PATENT DOCUMENTS

CN 106730819 A 5/2017
CN 108245887 A 7/2018
(Continued)

OTHER PUBLICATIONS

"League of Legends Beginner's Guide," available at https://web.archive.org/web/20160121020053/https://www.gamereplays.org/leagueoflegends/portals.php?show=index&name=league-of-legends-beginners-guide&tab=6916686; available at least by May 21, 2016 (Year: 2016).*

(Continued)

*Primary Examiner* — Jay Trent Liddle
(74) *Attorney, Agent, or Firm* — ARENTFOX SCHIFF LLP

(57) ABSTRACT

In a virtual object control method, a first virtual scene is displayed. The first virtual scene includes a map control. In response to a first trigger operation on the map control, the first trigger operation acting on a first operation, a second virtual scene corresponding to a first operation position is displayed. In response to a casting operation on a target skill, the casting operation corresponding to a second operation position, a skill casting target in the second virtual scene based on a second operation position is determined. A first virtual object is controlled to cast the target skill according
(Continued)

to the determined skill casting target. Apparatus and non-transitory computer-readable storage medium counterparts are also contemplated.

20 Claims, 13 Drawing Sheets

(51) Int. Cl.
*A63F 13/5372* (2014.01)
*A63F 13/5378* (2014.01)
*A63F 13/56* (2014.01)

(52) U.S. Cl.
CPC .......... *A63F 13/5378* (2014.09); *A63F 13/56* (2014.09); *A63F 2300/306* (2013.01); *A63F 2300/307* (2013.01); *A63F 2300/308* (2013.01)

(56) References Cited

U.S. PATENT DOCUMENTS

| | | | | |
|---|---|---|---|---|
| 10,413,821 | B2 | 9/2019 | Howard et al. | |
| 2014/0355868 | A1 | 12/2014 | Huang | |
| 2017/0124752 | A1 | 5/2017 | Huang | |
| 2018/0147488 | A1* | 5/2018 | Tang | A63F 13/422 |
| 2019/0060745 | A1 | 2/2019 | He | |
| 2019/0070493 | A1* | 3/2019 | He | A63F 13/426 |
| 2019/0070496 | A1 | 3/2019 | He | |
| 2019/0070497 | A1* | 3/2019 | He | G06F 3/0488 |
| 2019/0255437 | A1 | 8/2019 | Wang et al. | |
| 2020/0293154 | A1 | 9/2020 | Qiu et al. | |
| 2020/0298121 | A1 | 9/2020 | Deng | |
| 2021/0322864 | A1* | 10/2021 | Shao | A63F 13/92 |
| 2022/0305381 | A1* | 9/2022 | Shao | A63F 13/5378 |

FOREIGN PATENT DOCUMENTS

| | | | |
|---|---|---|---|
| CN | 108310770 | A | 7/2018 |
| CN | 108465240 | A | 8/2018 |
| CN | 109568957 | A | 4/2019 |
| CN | 109568965 | A | 4/2019 |
| CN | 110115838 | A | 8/2019 |
| CN | 110507993 | A | 11/2019 |
| CN | 110613938 | A | 12/2019 |
| CN | 111068320 | A | 4/2020 |
| CN | 111589142 | A | 8/2020 |
| WO | WO 2014/193668 | A1 | 12/2014 |
| WO | WO 2020/238592 | A1 | 12/2020 |
| WO | WO 2021/036577 | A1 | 3/2021 |

OTHER PUBLICATIONS

PapaSean, “How to use Quick Cast and advanced features” available at https://www.youtube.com/watch?v=l9aQY9XJklc&t=25s; May 13, 2016. (Year: 2016).*
Supplementary European Search Report issued Jul. 7, 2022 in Application No. 21785742.4, pp. 1-11.
Matthias Baldauf et al: “Investigating On-Screen Gamepad Designs for Smartphone-Controlled Video Games”, ACM Transactions on Multimedia Computing Communications Andapplications, Association for Computing Machinery, US, vol. 12, No. 1s, Oct. 21, 2015, pp. 1-21.
Japanese Office Action issued Jan. 9, 2024 in Application No. 2022-180557, pp. 1-11.
Kabukabu35, [Wot] Basic Operation of Self-propelled artillery [Beginner], Nov. 24, 2018, Internet <URL: https://web-hoshi.com/post-639>, pp. 1-19.
International Search Report and Written Opinion issued Jun. 28, 2021, in PCT/CN2021/083656, filed Mar. 29, 2021.
Office Action in JP2021562153, mailed May 2, 2022, 3 pages.
Torofie, “[Mobile Legends] Strategy for intermediate players,” Torofie’s Blog, Aug. 23, 2019 [retrieved on May 2, 2022]. Retrieved from the Internet: <URL:http://trokiss-gamer.com/smartphone-game/no-224/>, 9 pages.
YouTube video entitled: “Perfect Use of Mini Map | Map Awareness & Farming Guide | Mobile Legends Bang Bang,” uploaded Mar. 23, 2019 by user “Gaming Theos” [retrieved on May 2, 2022]. Retrieved from the Internet: <URL:https://www.youtube.com/watch?v=jq35rGBhpns>.
Filipino Subsequent Substantive Examination Report issued Sep. 21, 2023 in Application No. 1/2021/552516, pp. 1-4.
Korean Office Action issued Aug. 16, 2023 in Application No. 10-2021-7033731, pp. 1-47.
Nox App Player, ‘Completely conquer MOBA virtual keys (Mobile Legends, Penta Storm)’, Video posted on Internet YouTube, Mar. 31, 2020, <https://www.youtube.com/watch?v=U-6THcXgNbM>.
Gaming Theos, ‘Perfect use of Mini Map | Map Awareness & Farming Guide | MoBile Legends Bang Bang’, Video posted on YouTube, Mar. 24, 2019, <https://www.youtu be.com/watch?v=jq35rGBhpns>.
Chinese Office Action issued Oct. 26, 2022 in Application No. 202010412006.5, with English Translation, pp. 1-16.
Singaporean Office Action and Search Report issued Feb. 15, 2023 in Application No. 11202110880X, pp. 1-13.
Office Action received for Japanese Patent Application No. 2022-180557, mailed on Jan. 6, 2026, 26 pages (13 pages of English Translation and 13 pages of Original Document).

* cited by examiner

VIRTUAL OBJECT CONTROL METHOD AND APPARATUS, DEVICE, AND MEDIUM

RELATED APPLICATIONS

This application is a continuation application of International Application No. PCT/CN2021/083656, entitled "VIRTUAL OBJECT CONTROL METHOD AND APPARATUS, DEVICE, AND MEDIUM" and filed on Mar. 29, 2021, which claims priority to Chinese Patent Application No. 2020104120065, entitled "VIRTUAL OBJECT CONTROL METHOD AND APPARATUS, DEVICE, AND MEDIUM", and filed on May 15, 2020. The entire disclosures of the above-identified prior applications are incorporated herein by reference in their entirety.

FIELD OF THE TECHNOLOGY

This application relates to the field of computer technologies, including a virtual object control method and apparatus, a device, and a medium.

BACKGROUND OF THE DISCLOSURE

With the development of computer technologies and the diversity of terminal functions, more and more types of games can be played on a terminal. A multiplayer online battle arena (MOBA) game is a relatively popular game. The terminal may display a virtual scene in an interface, and display a virtual object in the virtual scene. The virtual object may play against other virtual objects by casting skills.

Generally, the display of the virtual scene is centered on a first virtual object currently controlled. At present, a virtual object control method is generally as follows: when a casting operation on a skill is detected, in the virtual scene centered on the first virtual object currently controlled, a casting target of the skill is determined according to an operation position of the casting operation, so as to control the first virtual object to cast the skill. The casting target is a position, a virtual object, or a direction in the virtual scene.

In the foregoing control method, when the casting operation is performed on the skill, the casting target can only be selected in the virtual scene centered on the first virtual object. If an object that a user wants to affect is not displayed in the virtual scene, a rough estimation needs to be performed to control the skill casting, resulting in a low precision and accuracy of the foregoing control method.

SUMMARY

Embodiments of this disclosure provide a virtual object control method and apparatus, a device, and a medium, which can improve the precision and accuracy of the control method. The technical solutions are as follows.

According to an aspect, a virtual object control method is provided, including: (1) displaying a first virtual scene, the first virtual scene including a map control; (2) displaying a second virtual scene corresponding to a first operation position in response to a first trigger operation on the map control, the first trigger operation acting on the first operation position; (3) determining a skill casting target in the second virtual scene based on a second operation position, in response to a casting operation on a target skill, the casting operation corresponding to the second operation position; and (4) controlling a first virtual object to cast the target skill according to the determined skill casting target.

According to an aspect, a virtual object control apparatus is provided, including: circuitry configured to (1) cause a virtual scene to be displayed, the virtual scene including a map control, and cause a second virtual scene corresponding to a first operation position to be displayed in response to a first trigger operation on the map control, the first trigger operation acting on the first operation position; (2) determine a skill casting target in the second virtual scene based on a second operation position in response to a casting operation on a target skill, the casting operation corresponding to the second operation position; and (3) control a first virtual object to cast the target skill according to the determined skill casting target.

According to an aspect, an electronic device is provided, including one or more processors (processing circuitry) and one or more memories, the one or more memories storing at least one program code, the at least one program code being loaded and executed by the one or more processors (processing circuitry) to implement the operations performed in the virtual object control method according to any one of the foregoing possible implementations.

According to an aspect, a non-transitory storage medium is provided, storing at least one program code, the at least one program code being loaded and executed by processing circuitry to implement the operations performed in the virtual object control method according to any one of the foregoing possible implementations.

BRIEF DESCRIPTION OF THE DRAWINGS

To describe technical solutions in embodiments of this disclosure more clearly, the following briefly introduces the accompanying drawings required for describing the embodiments. The accompanying drawings in the following description show only some embodiments of this disclosure, and a person of ordinary skill in the art may still derive other accompanying drawings from these accompanying drawings.

DESCRIPTION OF EMBODIMENTS

Figure 1:
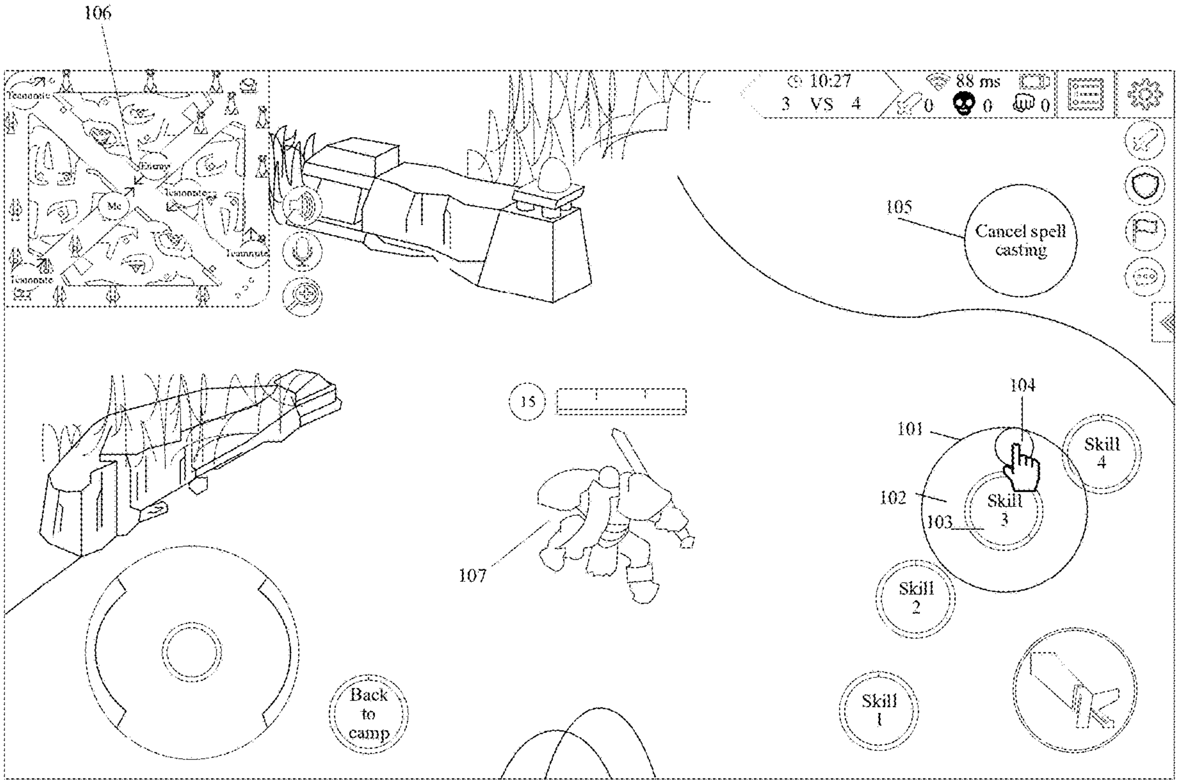
FIG. 1 is a schematic diagram of a terminal interface according to an embodiment of this disclosure.

To make objectives, technical solutions, and advantages of this disclosure clearer, the following further describes implementations of this disclosure in detail with reference to the accompanying drawings.

The terms "first," "second," and the like in this disclosure are used for distinguishing between same items or similar items of which effects and functions are basically the same. The "first," "second," and "nth" do not have a dependency relationship in logic or time sequence, and a quantity and an execution order thereof are not limited.

In this disclosure, the term "at least one" means one or more, and the term "at least two" means two or more. For example, at least two node devices mean two or more node devices.

Terms involved in this disclosure are explained below.

Virtual scene: a virtual scene displayed (or provided) when an application program is run on a terminal. The virtual scene is a simulated environment of a real world, or a semi-simulated semi-fictional virtual environment, or an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this disclosure. For example, the virtual scene includes the sky, the land, the ocean, or the like. The land includes environmental elements such as the desert and a city. The user can control the virtual object to move in the virtual scene. The virtual scene can be used for a virtual scene battle between at least two virtual objects, and there are virtual resources available to the at least two virtual objects in the virtual scene. The virtual scene can include two symmetric regions, virtual objects on two opposing camps occupy the regions respectively, and a goal of each side is to destroy a target building/fort/base/crystal deep in the opponent's region to win victory. For example, the symmetric regions are a lower left corner region and an upper right corner region, or a middle left region and a middle right region.

Virtual object: a movable object in a virtual scene. The movable object is a virtual character, a virtual animal, a cartoon character, or the like, for example, a character, an animal, a plant, an oil drum, a wall, or a stone displayed in a virtual scene. The virtual object is a virtual image used for representing a user in the virtual scene. The virtual scene may include a plurality of virtual objects, and each virtual object has a shape and a volume in the virtual scene, and occupies some space in the virtual scene. When the virtual scene is a three-dimensional virtual scene, the virtual object is a three-dimensional model, the three-dimensional model is a three-dimensional character constructed based on a three-dimensional human skeleton technology, and the same virtual object shows different appearances by wearing different skins. In some embodiments, the virtual objects are implemented by using a 2.5-dimensional model or a two-dimensional model. This is not limited in the embodiments of this disclosure.

The virtual object is a player character controlled through an operation on a client, or an artificial intelligence (AI) character set in a virtual scene battle through training, or a non-player character (NPC) set in a virtual scene interaction. Alternately, the virtual object is a virtual character for competition in a virtual scene. Alternately, a quantity of virtual objects participating in the interaction in the virtual scene is preset, or is dynamically determined according to a quantity of clients participating in the interaction.

A MOBA game is a game in which several forts are provided in a virtual scene, and users on different camps control virtual objects to battle in the virtual scene, occupy forts or destroy forts of the opposing camp. For example, a MOBA game may divide users into at least two opposing camps, and different virtual teams on the at least two opposing camps occupy respective map regions, and compete against each other using specific victory conditions as goals. The victory conditions include, but are not limited to at least one of occupying forts or destroy forts of the opposing camps, killing virtual objects in the opposing camps, ensure own survivals in a specified scenario and time, seizing a specific resource, and outscoring the opponent within a specified time. For example, in the MOBA game, the users may be divided into two opposing camps. The virtual objects controlled by the users are scattered in the virtual scene to compete against each other, and the victory condition is to destroy or occupy all enemy forts.

Each virtual team includes one or more virtual objects, such as 1, 2, 3, or 5. According to a quantity of virtual objects in each team participating in the battle arena, the battle arena may be divided into 1V1 competition, 2V2 competition, 3V3 competition, 5V5 competition, and the like. 1V1 means "1 vs. 1", and details are not described herein.

The MOBA game may take place in rounds (or turns), and each round of the battle arena has the same map or different maps. A duration of one round of the MOBA game is from a moment at which the game starts to a movement at which the victory condition is met.

In the MOBA game, a user can control a virtual object to fall freely, glide, parachute, or the like in the sky of the virtual scene, or to run, jump, crawl, walk in a stooped posture, or the like on the land, or can control a virtual object to swim, float, dive, or the like in the ocean. Herein, the scenes are merely used as examples, and no specific limitations are set in the embodiments of this disclosure.

In the MOBA games, users can further control the virtual objects to cast skills to fight with other virtual objects. For example, the skill types of the skills may include an attack skill, a defense skill, a healing skill, an auxiliary skill, a beheading skill, and the like. Each virtual object may have one or more fixed skills, and different virtual objects generally have different skills, and different skills may produce different effects. For example, if an attack skill cast by a virtual object hits a hostile virtual object, certain damage is caused to the hostile virtual object, which is generally shown as deducting a part of virtual health points of the hostile virtual object. In another example, if a healing skill cast by a virtual object hits a friendly virtual object, a certain healing effect is produced for the friendly virtual object, which is generally shown as restoring a part of virtual health points of the friendly virtual object, and all other types of skills may produce corresponding effects. Details are not described herein again.

In the embodiments of this disclosure, two skill casting methods are provided. Different skill casting methods correspond to different operation methods. A user may freely select or switch a skill casting method for skill casting according to a use habit of the user to meet needs, which greatly improves the accuracy of skill casting.

The two skill casting methods may be respectively active casting and quick casting. The active casting refers to determining a skill casting target through a user operation. The quick casting refers to automatically determining a skill casting target by a terminal.

In some embodiments, a corresponding operation region is set for the two skill casting methods. The operation region corresponding to the active casting is a first operation region, and the operation region corresponding to the quick casting is a second operation region. The first operation region surrounds the second operation region.

In some embodiments, the terminal determines which skill casting method is according to a relationship between an operation position and the operation region when a casting operation of a skill ends. For example, if the operation position when the casting operation ends is in the first operation region, the skill casting method is the active casting; and if the operation position when the casting operation ends is in the second operation region, the skill casting method is the quick casting. The quick casting does not need the user operation to select the casting target, greatly simplifying operations of the user, reducing operation complexity, and providing a convenient operation method. Through the active casting, the user may freely select the casting target, which can be more precise, improving skillfulness of operations of the user, more in line with operation requirements of high-end players, and improving user experience.

The following briefly introduces the related content of skill casting.

The skill casting may be implemented by operating a skill control, and a region including the skill control may be a skill wheel. The foregoing skill casting methods may be implemented by operating the skill wheel. In some embodiments, the second operation region may be a region where the skill control is located or a region of which a distance from a center position of the skill control is less than a distance threshold, and the first operation region may be a region outside the second operation region. The skill wheel is the region composed of the first operation region and the second operation region.

For example, as shown in FIG. 1, the virtual object 107 may have a plurality of skills: a skill 1, a skill 2, a skill 3, and a skill 4. When a casting operation is performed on the skill 3, a skill wheel 101 may be displayed. The skill wheel 101 may include a first operation region 102 and a second operation region 103. The second operation region displays a skill control of the skill 3. When a drag operation is performed, a skill joystick 104 is controlled to move in the skill wheel to achieve change of an operation position. The skill joystick 104 can be located in the skill wheel 101.

An example in which the casting operation on the skill is implemented by dragging the skill joystick is used. The user can perform a drag operation on the skill joystick 104. If the operation is ended without dragging the skill joystick 104 out of the first operation region, the casting method is determined as the quick casting. If the skill joystick 104 is dragged out of the first operation region and enters the second operation region, and the operation is ended, the casting method can be determined as the active casting. That is, if an end position of the drag operation of the skill joystick 104 is in the first operation region, the quick casting is performed on the skill; and if an end position of the drag operation of the skill joystick 104 is outside the first operation region and in the second operation region, the active casting is performed on the skill.

In some embodiments, the terminal displays a casting cancel control in a graphical user interface, and the casting cancel control is used for canceling the casting of the skill. Alternately, in response to end of a trigger operation on the skill, and an end position of the trigger operation being at a position of the casting cancel control, the terminal cancels the casting of the skill. A method for canceling skill casting is provided based on the casting cancel control, which enriches skill casting operations, provides users with more skill casting functions, and improves user experience. For example, as shown in FIG. 1, the interface may display the casting cancel control 105. If the user continues the casting operation and moves to the casting cancel control 105, this skill casting can be canceled.

Figure 2:
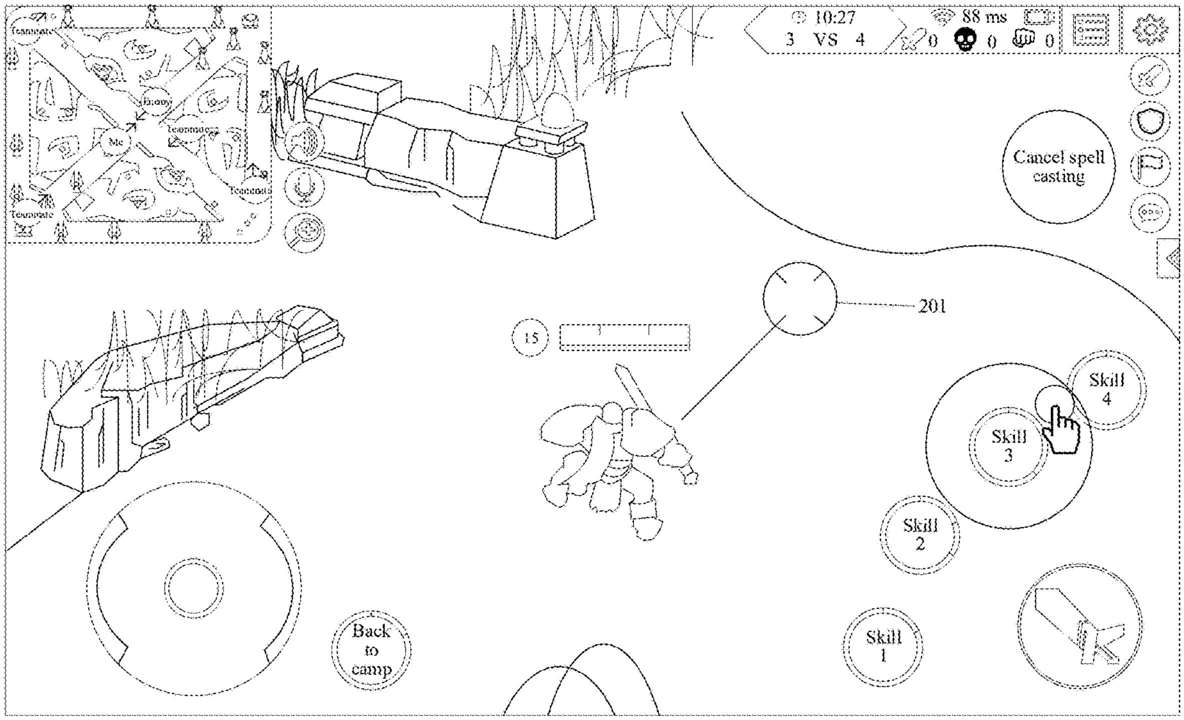
FIG. 2 is a schematic diagram of a terminal interface according to an embodiment of this disclosure.
Figure 3:
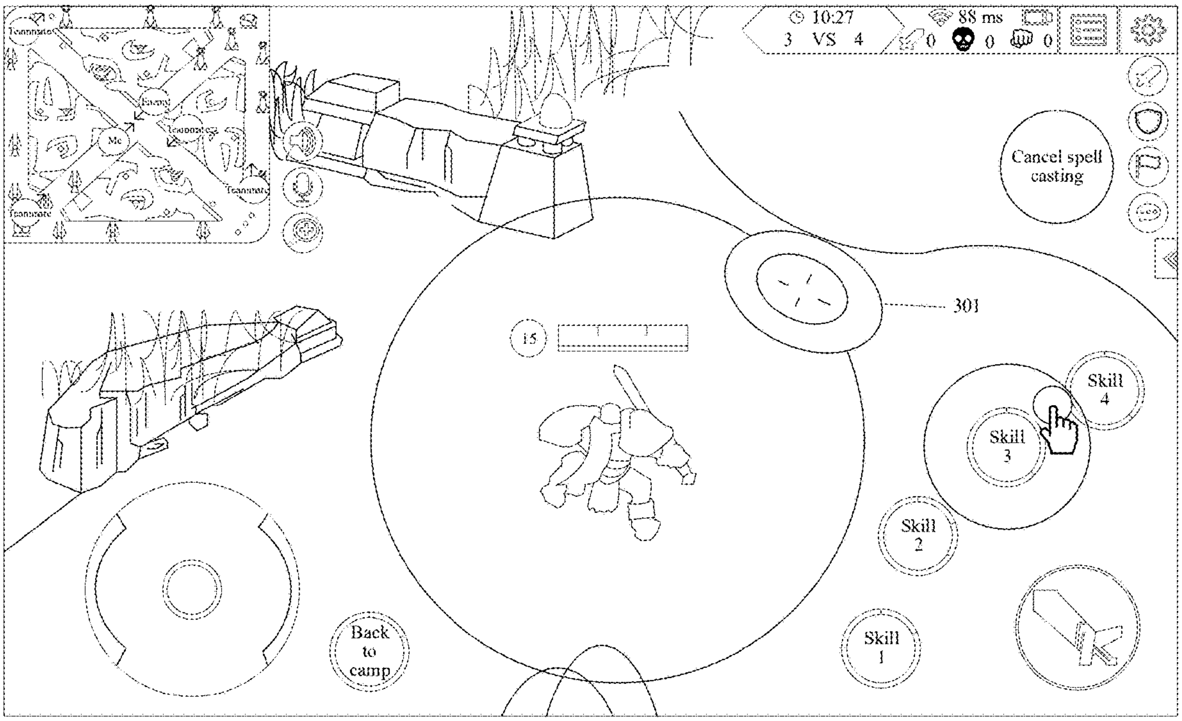
FIG. 3 is a schematic diagram of a terminal interface according to an embodiment of this disclosure.
Figure 4:
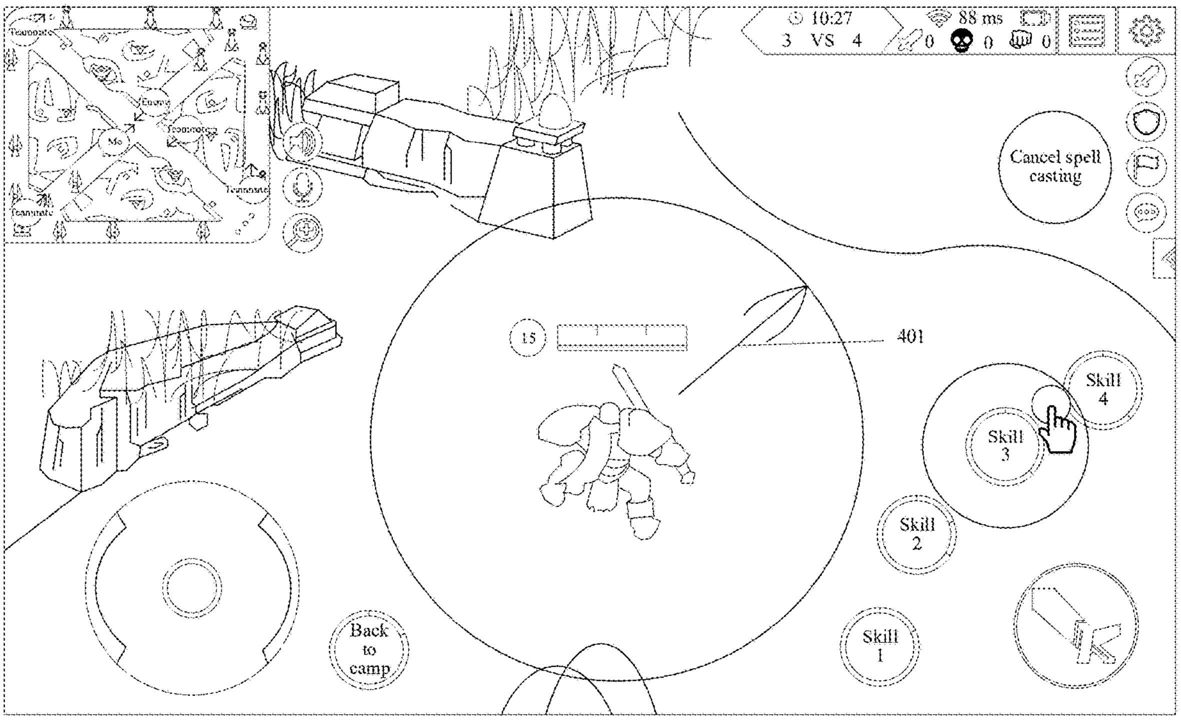
FIG. 4 is a schematic diagram of a terminal interface according to an embodiment of this disclosure.

Skills of a virtual object include different types of skills. For example, some skills are target-based skills, some skills are position-based skills, and some skills are direction-based skills. For example, as shown in FIG. 2, the skill is a target-based skill 201, which needs to select a target virtual object to be cast. As shown in FIG. 3, the skill is a position-based skill 301, which needs to select a casting position. As shown in FIG. 4, the skill is a direction-based skill 401, which needs to select a casting direction.

The following describes a system architecture related to this disclosure.

Figure 5:
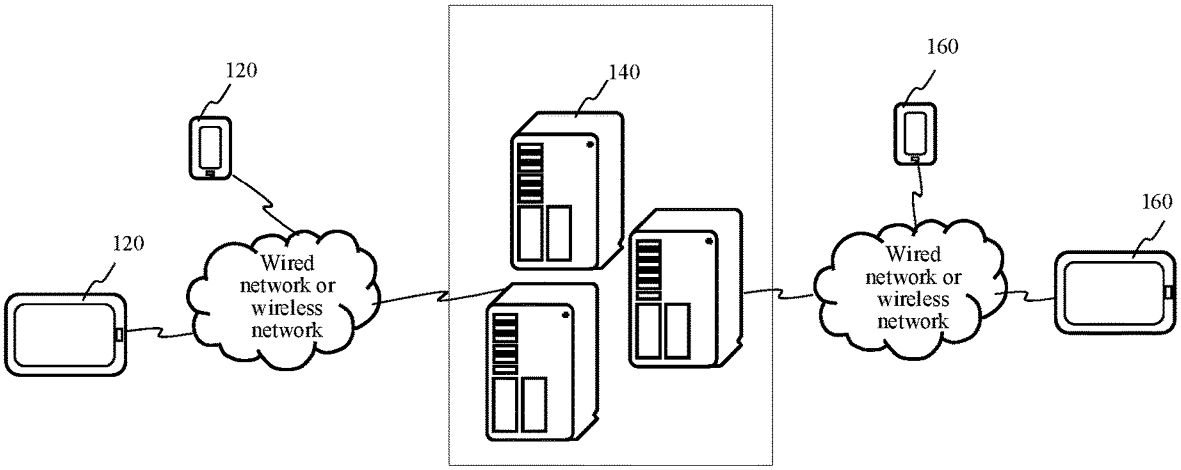
FIG. 5 is a schematic diagram of an implementation environment of a virtual object control method according to an embodiment of this disclosure.

FIG. 5 is a schematic diagram of an implementation environment of a virtual object control method according to an embodiment of this disclosure. Referring to FIG. 5, the implementation environment includes: a first terminal 120, a server 140, and a second terminal 160.

An application program supporting a virtual scene is installed and run on the first terminal 120. The application program may be any one of a MOBA game, a virtual reality application program, a 2D or 3D map program, and a simulation program. Certainly, the application program may alternatively be another program, for example, a multiplayer shooting survival game. This is not limited in the embodiments of this disclosure. The first terminal 120 may be a terminal used by a first user, and the first user uses the first terminal 120 to operate a first virtual object in the virtual scene to perform a movement. The movement includes, but is not limited to, at least one of walking, running, body posture adjustment, ordinary attacking, and skill casting. Certainly, the movement may further include other items, such as shooting and throwing. This is not specifically limited in the embodiments of this disclosure. For example, the first virtual object is a first virtual character such as a simulated character role or a cartoon character role. For example, the first virtual object may be a first virtual animal such as a simulated monkey or another animal.

The first terminal 120 and the second terminal 160 are connected to the server 140 by using a wireless network or a wired network.

The server 140 may include at least one of one server, a plurality of servers, a cloud computing platform, and a virtualization center. The server 140 is configured to provide a backend service for an application program supporting a virtual scene. The server 140 may take on primary computing work, and the first terminal 120 and the second terminal 160 may take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

The server 140 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content distribute network (CDN), big data, and an AI platform. The first terminal 120 and the second terminal 160 may be a smartphone, a tablet computer, a notebook computer, a desktop computer, a smart speaker, a smartwatch, or the like, but are not limited thereto. The first terminal 120 and the second terminal 160 may be directly or indirectly connected to the server in a wired or wireless communication manner. This is not limited in the embodiments of this disclosure.

For example, the first terminal 120 and the second terminal 160 may transmit generated data to the server 140, and the server 140 may verify data generated by itself and the data generated by the terminals. If the data generated by the server is inconsistent with the data indicated by a verification result of any terminal, the data generated by the server may be transmitted to any terminal, and the data generated by the server prevails for any terminal.

In some embodiments, the first terminal 120 and the second terminal 160 may determine each frame of virtual scene according to a trigger operation of a user, and transmit the virtual scene to the server 140, and may also transmit information about the trigger operation of the user to the server 140. The server 140 may receive the information about the trigger operation and the virtual scene, and determine a virtual scene according to the trigger operation. Compared with the virtual scene uploaded by the terminals, if the two virtual scenes are consistent, subsequent calculation may be continued; and if the two virtual scenes are inconsistent, the virtual scene determined by the server may be transmitted to each terminal for synchronization. In a specific possible embodiment, the server 140 may also determine a next frame of virtual scene of each terminal according to the information about the trigger operation, and transmit the next frame of virtual scene to each terminal, so that each terminal performs corresponding steps to obtain a virtual scene consistent with the next frame of virtual scene determined by the server 140.

An application program supporting a virtual scene is installed and run on the second terminal 160. The application program may be any one of a MOBA game, a virtual reality application program, a 2D or 3D map program, and a simulation program. Certainly, the application program may alternatively be another program, for example, a multiplayer shooting survival game. This is not limited in the embodiments of this disclosure. The second terminal 160 may be a terminal used by a second user, and the second user uses the second terminal 160 to operate a second virtual object in the virtual scene to perform a movement. The movement includes, but is not limited to, at least one of walking, running, body posture adjustment, ordinary attacking, and skill casting. Certainly, the movement may further include other items, such as shooting and throwing. This is not specifically limited in the embodiments of this disclosure. For example, the second virtual object is a second virtual character, such as a simulated character role or a cartoon character role. For example, the second virtual object may be a second virtual animal such as a simulated monkey or another animal.

The first virtual object controlled by the first terminal 120 and the second virtual object controlled by the second terminal 160 can be located in the same virtual scene, and in this case, the first virtual object may interact with the second virtual object in the virtual scene. In some embodiments, the first virtual object and the second virtual object may be in an opposing relationship, for example, the first virtual object and the second virtual object may belong to different teams, organizations, or camps. The virtual objects in the opposing relationship may battle against each other by casting skills at any position in the virtual scene.

In some other embodiments, the first virtual object and the second virtual object may be teammates, for example, the first virtual character and the second virtual character may belong to the same team, the same organization, or the same camp, and have a friend relationship with each other or have a temporary communication permission.

The application programs installed on the first terminal 120 and the second terminal 160 are the same, or the application programs installed on the two terminals can be the same type of application programs on different operating system platforms. The first terminal 120 may be generally one of a plurality of terminals, and the second terminal 160 may be generally one of a plurality of terminals. In this embodiment, only the first terminal 120 and the second terminal 160 are used for description. Device types of the first terminal 120 and the second terminal 160 are the same or different. The device type includes at least one of a smartphone, a tablet computer, an e-book reader, a Moving Picture Experts Group Audio Layer III (MP3) player, a Moving Picture Experts Group Audio Layer IV (MP4) player, a laptop computer, and a desktop computer. For example, the first terminal 120 and the second terminal 160 may be smartphones, or other handheld portable game devices. The following embodiment is described by using an example that the terminal includes a smartphone.

A person skilled in the art may understand that there may be more or fewer terminals. For example, there may be only one terminal, or there may be dozens of or hundreds of terminals or more. The quantity and the device type of the terminal are not limited in the embodiments of this disclosure.

Figure 6:
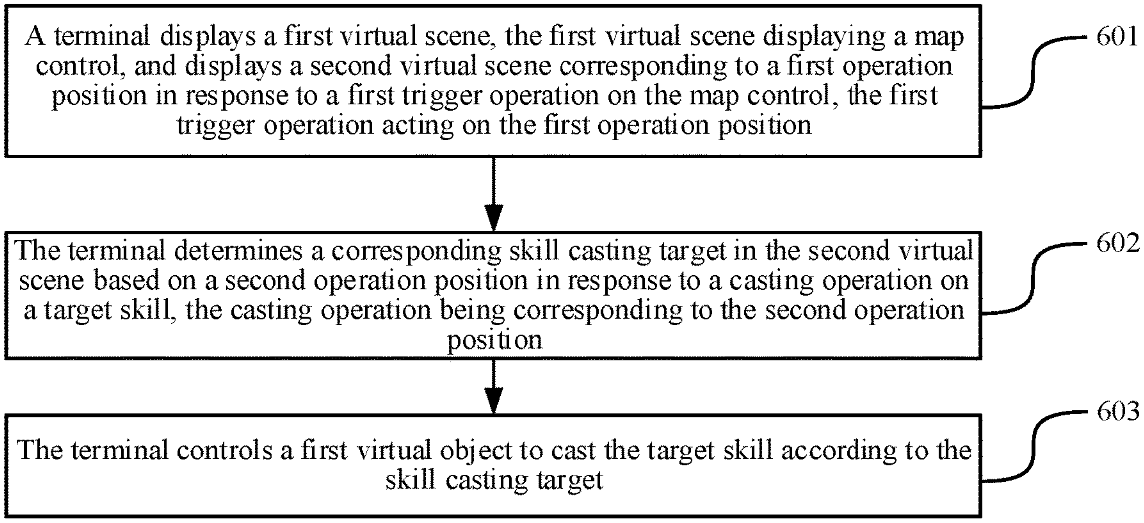
FIG. 6 is a flowchart of a virtual object control method according to an embodiment of this disclosure.

FIG. 6 is a flowchart of a virtual object control method according to an embodiment of this disclosure. The method is applicable to an electronic device. The electronic device may be a terminal or may be a server. This is not limited in this embodiment of this disclosure. In this embodiment, an example in which the method is applied to a terminal is used. Referring to FIG. 6, the method may include the following steps.

In step 601, a terminal displays a first virtual scene, the first virtual scene displaying a map control 106, and displays a second virtual scene corresponding to a first operation position in response to a first trigger operation on the map control 106, the first trigger operation acting on the first operation position.

In the foregoing process, the terminal, in response to the first trigger operation on the map control, switches a virtual scene (that is, the first virtual scene) displayed in a graphical user interface to a target virtual scene (that is, the second virtual scene) corresponding to the first operation position according to the first operation position of the first trigger operation.

The map control is used for displaying a map of the virtual scene, and the currently displayed virtual scene may be changed by operating the map control. If the map control is not operated, the currently displayed virtual scene is generally a partial virtual scene with the currently controlled first virtual object as a center, that is, the first virtual scene. If a certain position on the map control is operated, a position of a virtual camera may be adjusted to display other partial virtual scenes.

The first trigger operation is a click/tap operation or a sliding operation. This is not limited in this embodiment. For example, an example in which the first trigger operation is a click/tap operation is used. A user clicks/taps a certain position in the map control, and the position is the first operation position, then the second virtual scene is a virtual scene with the first operation position as a center, or the second virtual scene is a virtual scene with the first operation position as a start point. This is not limited in this embodiment. An example in which the first trigger operation is a drag operation. A user may slide on the map control. In this case, the displayed virtual scene may be updated in real time according to an operation position during sliding, so as to facilitate more detailed and precise adjustment of the displayed virtual scene.

In step 602, the terminal determines a corresponding skill casting target in the second virtual scene based on a second operation position in response to a casting operation on a target skill, the casting operation being corresponding to the second operation position.

In the foregoing process, the terminal determines the skill casting target corresponding to the second operation position in the target virtual scene according to the second operation position of the casting operation in response to the casting operation on the target skill.

The target skill refers to a capability of the virtual object in the virtual scene. From the perspective of a skill casting effect, the target skill may be an action skill or an attribute change skill. For example, a virtual object may have three skills, where one is an action skill for sprinting forward, one is an attribute buff skill for increasing a movement speed of the virtual object, and the other is an attribute debuff skill for weakening attacks on nearby teammates. From the perspective of casting types of skills, the target skill may be any one of a position-based skill, a direction-based skill, and a target-based skill.

In some embodiments, the casting operation is a click/tap operation or a drag operation. This is not limited in this embodiment. Corresponding to the two skill casting methods, if the casting operation is a click/tap operation, the casting method is quick casting, and if the casting operation is a drag operation, the casting method can be determined according to an operation position when the casting operation ends.

In this embodiment, the currently displayed first virtual scene has been switched to the second virtual scene selected by using the map control through the step 601. If the user wants to cast a skill at a certain position in the second virtual scene, or cast a skill on a certain virtual object in the second virtual scene, or determine a skill casting direction at a position of the virtual object in the second virtual scene, a casting operation on the skill may be performed. The terminal detects the casting operation, and may determine a skill casting target according to a second operation position in response to the casting operation. The skill casting target is any one of a skill casting position, a target virtual object, or a skill casting direction. That is, the skill casting target is a target virtual object or a position in the second virtual scene, or a direction formed by the position and the first virtual object.

The display content of the graphical user interface is switched to the second virtual scene corresponding to the first operation position. In this case, the selection range of the skill casting target may not be limited to the virtual scene with the virtual object as a center, the casting operation has a higher degree of freedom, and the selection can be accurately performed according to the case of a desired casting position when the skill is cast, rather than a rough estimation in the currently displayed virtual scene, improving the precision and accuracy of the virtual object control method.

In step 603, the terminal controls a first virtual object to cast the target skill according to the skill casting target.

After determining the skill casting target, the terminal may be controlled to cast the skill according to the skill casting target. In some embodiments, the process of casting the skill may alternatively be as follows: the terminal displays a casting effect generated when the skill is cast to the target virtual object in the graphical user interface. For example, if the skill casting target is a target virtual object, a casting process effect of the skill may be displayed between the first virtual object and the target virtual object, and a cast effect may be displayed on the target virtual object. In another example, if the skill casting target is a casting position, a target animation may be displayed at the casting position to reflect a cast effect, and if the casting position includes a second virtual object, it may be displayed that an attribute value of the second virtual object is affected. In another example, if the skill casting target is a casting direction, a casting process effect of the skill may be displayed in casting direction.

In this embodiment, the second virtual scene corresponding to the first operation position is displayed in the graphical user interface according to the first operation position of the first trigger operation on the map control. In this case, in response to the casting operation on the target skill, the skill casting target corresponding to the target skill in the currently displayed second virtual scene can be determined according to the operation position corresponding to the casting operation, so as to cast the skill. In the foregoing method of controlling skill casting by using the map control, the corresponding second virtual scene can be displayed when the first trigger operation is performed on the map control. In this case, the selection range of the skill casting target may not be limited to the virtual scene with the virtual object as a center, the casting operation has a higher degree of freedom, and the selection can be accurately performed according to the case of a desired casting position when the skill is cast, rather than a rough estimation in the currently displayed virtual scene, improving the precision and accuracy of the virtual object control method.

Figure 7:
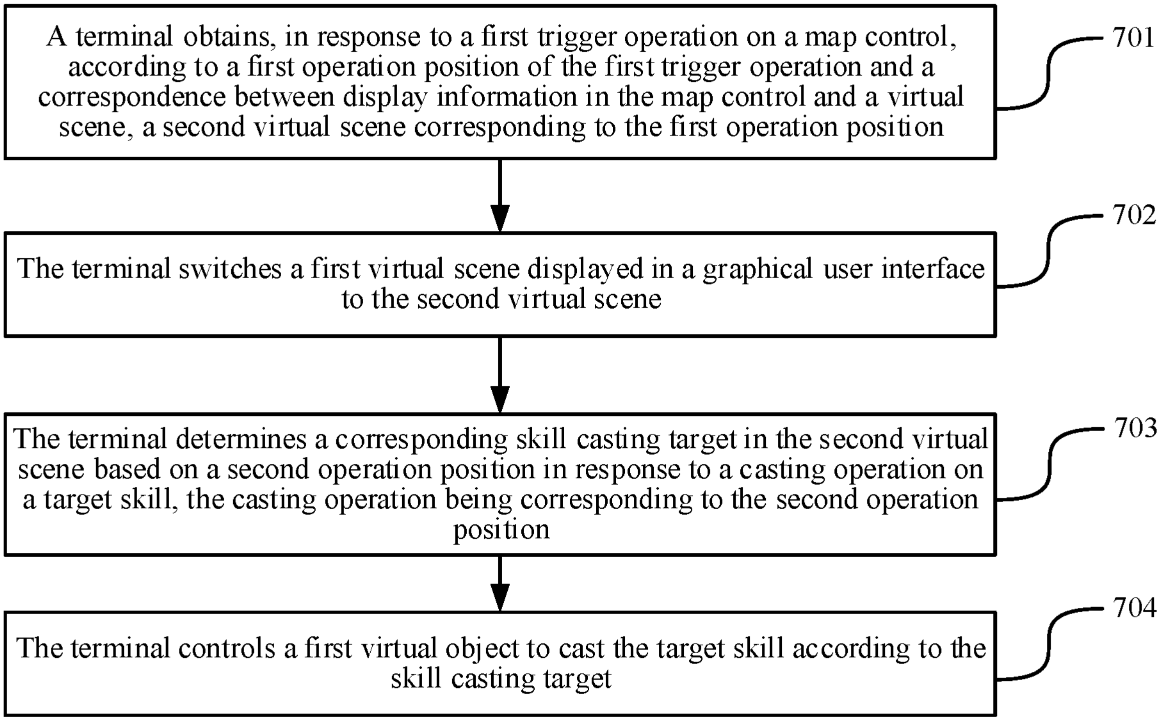
FIG. 7 is a flowchart of a virtual object control method according to an embodiment of this disclosure.

FIG. 7 is a flowchart of a virtual object control method according to another embodiment of this disclosure. Referring to FIG. 7, the method may include the following steps.

In step 701, a terminal obtains, in response to a first trigger operation on a map control, according to a first operation position of the first trigger operation and a correspondence between display information in the map control and a virtual scene, a second virtual scene corresponding to the first operation position.

If the user wants to change the currently displayed virtual scene by using the map control, the first trigger operation is performed on the map control. The terminal can switch the virtual scene according to the first operation position of the first trigger operation, so as to achieve the adjustment of observation angles of the virtual scene and the adjustment of visual field pictures.

In some embodiments, the map control displays brief information of a global virtual scene, for example, displaying a thumbnail of the global virtual scene. In some embodiments, the map control displays identification information of some or all of the virtual objects according to positions of some or all of the virtual objects in the virtual scene, for example, the identification information is an avatar.

The display information in the map control has a correspondence with the virtual scene. In a specific example, the thumbnail of the virtual scene displayed in the map control is 2D information, the virtual scene is a 3D virtual space, and the thumbnail is an image in which a top view of the virtual scene is reduced by a certain ratio or an image including part of important information of the reduced image.

Figure 8:
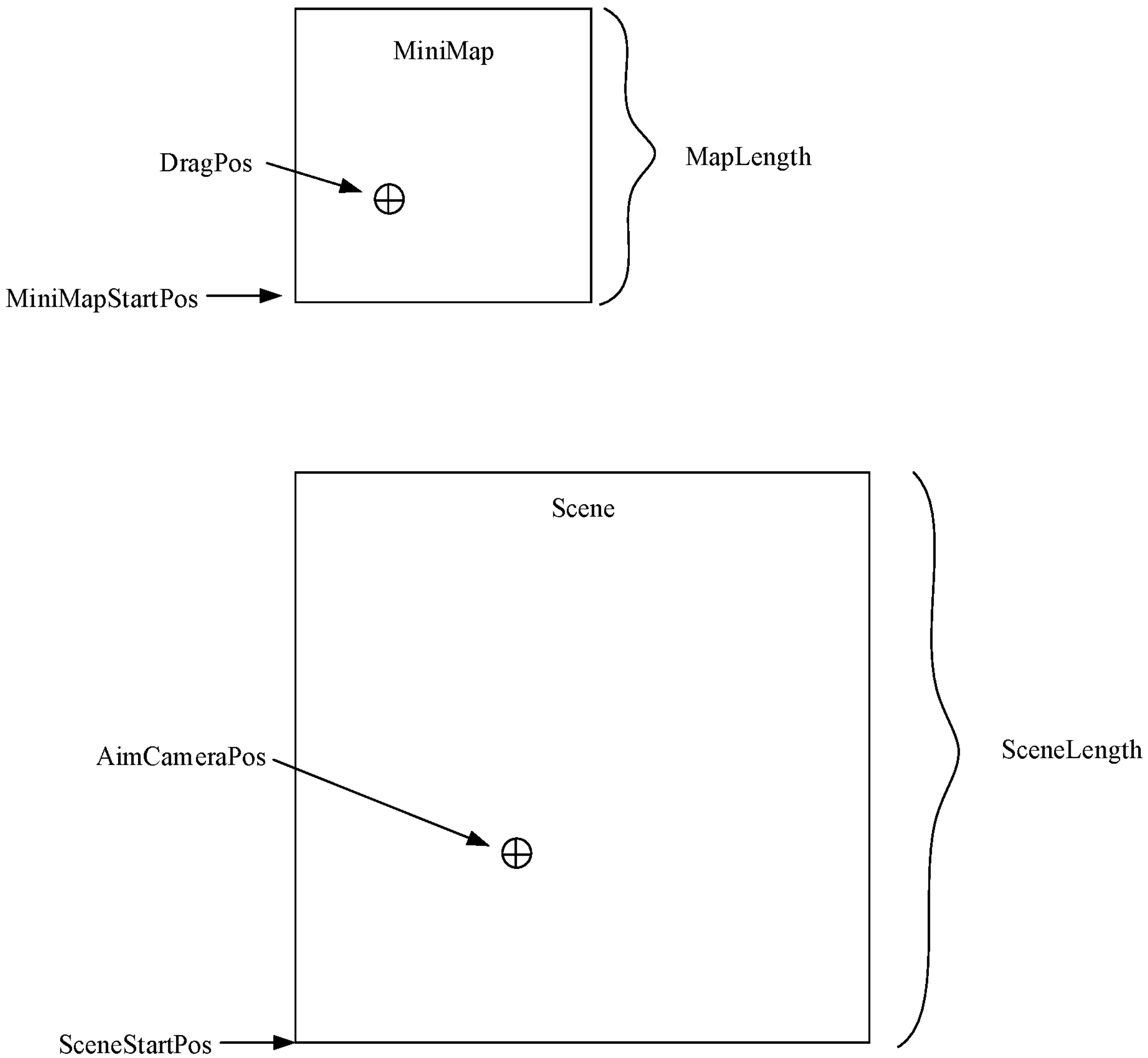
FIG. 8 is a schematic diagram of a correspondence between a minimap and a virtual scene according to an embodiment of this disclosure.

For example, as shown in FIG. 8, for the correspondence between the display information in the map control and the virtual scene, a correspondence between a map control (also referred to as a minimap) and a top view of a virtual scene (a 2D virtual scene). In three-dimensional coordinates, the y-axis may be omitted, and the x-axis and z-axis of the display information in the map control are respectively mapped to the x-axis and z-axis of the 2D virtual scene.

In a specific example, assuming that the global virtual scene is a square, MapLength and SceneLength are used to respectively represent the side length of the minimap and the side length of the scene. MimiMapStartPos represents the lower left corner of the minimap, which is the start position of the minimap. Generally, this parameter is set when a user interface (UI) of the minimap is initialized. SceneStartPos represents the lower left corner of the virtual scene, which is the start position of the virtual scene. Generally, this parameter is set during map editing. The first operation position is named as DragPos. It can be understood that the position of DragPos in MiniMap is equivalent to the position of AimCameraPos in Scene, which can be expressed by the following formula 1:

(DragPos−MiniMapStartPos)/MapLength=(AimCameraPos−SceneStartPos)/SceneLength  Formula 1:

The following formula 2 can be obtained based on the foregoing formula 1. AimCameraPos in Scene corresponding to DragPos in MiniMap can be calculated based on the formula 2.

AimCameraPos=(DragPos−MiniMapStartPos)*SceneLength/MapLength+SceneStartPos  Formula 2:

In the foregoing formula 1 and formula 2, MaxAimRadius is a maximum aiming range of a skill button, AimCameraPos is a scene position of a screen center point in a second virtual scene, DragPos is a drag position in a minimap, MiniMapStartPos is a start position of the minimap, SceneLength is a length of the scene, which is the side length of the scene, MapLength is a length of the minimap, which is the side length of the minimap, and SceneStartPos is a start position of the scene. * indicates a multiplication operation.

If the user does not operate the map control, AimCameraPos is assigned to InValidAimCameraPos. InValidAimCameraPos means that the current minimap is not pressed.

In some embodiments, the display information is a position or a region. Correspondingly, the process of determining the second virtual scene in the step 701 may include two implementations.

Implementation 1. The terminal determines a target region with the first operation position as a center and a first target size as a size in the map control according to the first operation position of the first trigger operation, and determines the second virtual scene corresponding to the target region in the virtual scene according to the correspondence between the display information in the map control and the virtual scene.

In the implementation 1, the terminal obtains the target region with the first operation position as a center and the first target size as a size in the map control according to the first operation position of the first trigger operation, and obtains the target virtual scene, that is, the second virtual scene, corresponding to the target region according to the correspondence between the display information in the map control and the virtual scene.

Figure 9:
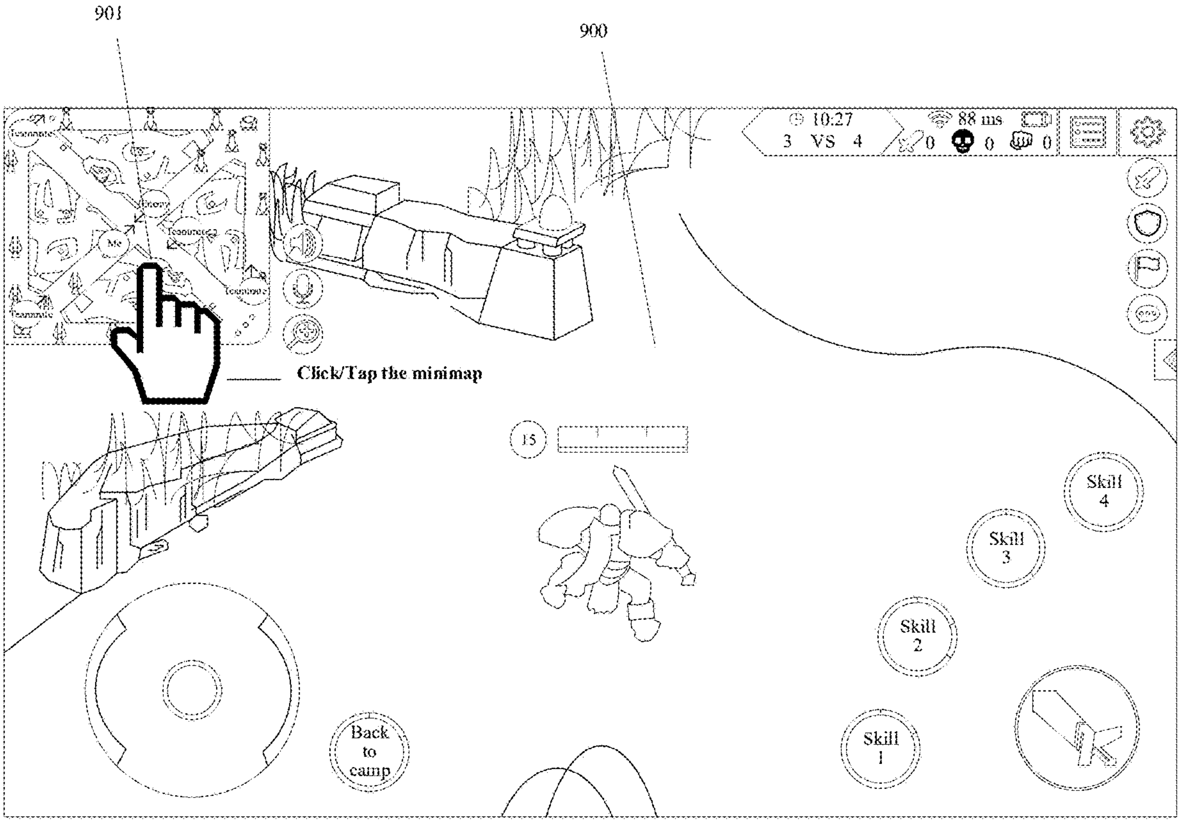
FIG. 9 is a schematic diagram of a terminal interface according to an embodiment of this disclosure.

The target region may be a rectangular region or a region of another shape. This is not limited in this embodiment of this disclosure. For example, as shown in FIG. 9, the target region 901 is a region with the first operation position as a center in the map control.

Implementation 2. The terminal determines a target position corresponding to the first operation position in the virtual scene and determines the second virtual scene with the target position as a center and a second target size as a size according to the first operation position and the correspondence between the display information in the map control and the virtual scene.

The terminal obtains the position corresponding to the first operation position in the virtual scene and obtains the target virtual scene, that is, the second virtual scene, with the corresponding position as a center and the second target size as a size according to the first operation position and the correspondence between the display information in the map control and the virtual scene.

In the implementation 2, when the user performs the first trigger operation on the map control, the first operation position of the first trigger operation is a basis for obtaining the second virtual scene. The user may change the second virtual scene by changing the first operation position.

In some embodiments, the second virtual scene is a virtual scene with the position corresponding to the first operation position in the virtual scene as a center. Therefore, the terminal can refer to the foregoing correspondence to determine the position corresponding to the first operation position in the virtual scene, so as to analyze which position is used as the center of the second virtual scene, and then combine a display visual field (that is, the size) of the second virtual scene, to obtain the second virtual scene.

In a specific example, the terminal converts the 2D first operation position into the 3D position in the virtual scene according to the correspondence between the display information in the map control and the virtual scene. Generally, the process of displaying the virtual scene is usually implemented through observation of a virtual camera to simulate an observation field of view when a certain real environment is observed by using a certain camera. To achieve a better 3D effect, the virtual camera is at a certain height above the ground of the virtual scene and observes the virtual scene through a certain oblique view angle. Therefore, the terminal can obtain the position of the virtual camera according to a corresponding position of the first operation position in the virtual scene, a height of the virtual camera, and a target angle, and obtain the second virtual scene from the global virtual scene through the position of the virtual camera.

Figure 10:
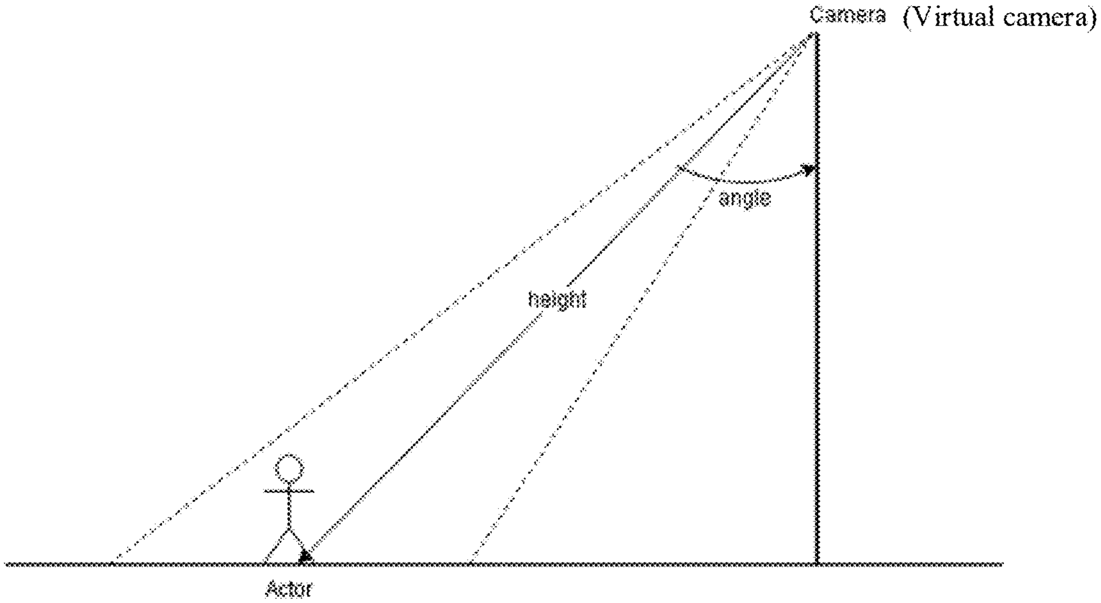
FIG. 10 is a schematic diagram of a relationship between a camera position and an actor position according to an embodiment of this disclosure.

For example, as shown in FIG. 10, the position AimCameraPos corresponding to the first operation position DragPos in the virtual scene may be determined by the foregoing method, AimCameraPos is assigned to ActorPos, and the position of the virtual camera (also referred to as a lens) is calculated with ActorPos. In some embodiments, the terminal may determine whether there is a first trigger operation on the map control, that is, whether AimCameraPos is InValidAimCameraPos, and if yes, the lens follows the first virtual object, and the position of the first virtual object may be assigned to ActorPos. If no, the lens follows the lens position dragged on the minimap, that is, AimCameraPos may be obtained and assigned to ActorPos.

The position of the virtual camera may be obtained based on ActorPos by using the following formula 3 to formula 5.

$$cameraPos.x=ActorPos.x, \quad \text{Formula 3:}$$

$$cameraPos.y=ActorPos.y+height*\cos(angle), \text{ and} \quad \text{Formula 4:}$$

$$cameraPos.z=ActorPos.z-height*\sin(angle). \quad \text{Formula 5:}$$

Here, cameraPos.x, cameraPos.y, and cameraPos.z are respectively coordinates of x, y, and z axes of the virtual camera, ActorPos.x, ActorPos.y, and ActorPos.z are respectively coordinates of x, y, and z axes of ActorPos, height is the height of the virtual camera, and angle is the oblique angle of the virtual camera. cos( ) is a cosine function, and sin( ) is a sine function.

In step 702, the terminal switches a first virtual scene displayed in a graphical user interface to the second virtual scene.

After obtaining the second virtual scene, the terminal displays the second virtual scene in the graphical user interface, so that the visual field is properly adjusted to allow the user to perform the casting operation on the skill more accurately.

Figure 11:
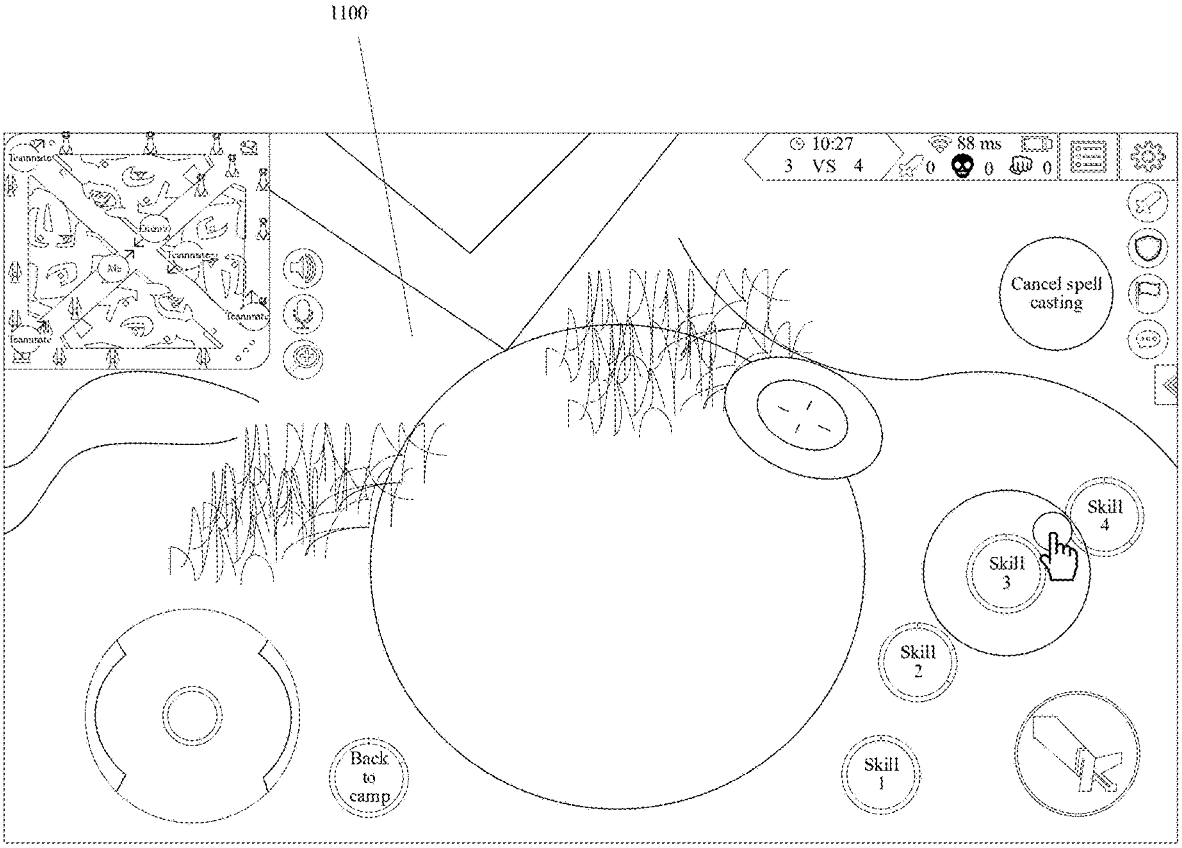
FIG. 11 is a schematic diagram of a terminal interface according to an embodiment of this disclosure.

Steps 701 and 702 perform the process of switching the first virtual scene displayed in the graphical user interface to the second virtual scene corresponding to the first operation position according to the first operation position of the first trigger operation in response to the first trigger operation on the map control. For example, as shown in FIG. 9 and FIG. 11, the terminal displays a virtual scene 900 with a first virtual object as a center. If the user performs a first trigger operation on a map control, the terminal may obtain a corresponding second virtual scene and switch the virtual scene. The switched virtual scene is no longer the virtual scene with the first virtual object as a center, and may be a second virtual scene 1100, as shown in FIG. 11.

In step 703, the terminal determines a corresponding skill casting target in the second virtual scene based on a second operation position in response to a casting operation on a target skill, the casting operation being corresponding to the second operation position.

In step 703, the terminal determines the skill casting target corresponding to the second operation position in the second virtual scene according to the second operation position of the casting operation in response to the casting operation on the target skill.

When the second operation position of the casting operation is different, the casting method of the skill may be different, and correspondingly, the process of determining the skill casting target according to the second operation position is different.

In some embodiments, the casting operation is a second trigger operation on a skill control. For example, if the casting operation is active casting, the terminal determines the skill casting target corresponding to the second operation position in the second virtual scene according to a position relationship between the second operation position of the second trigger operation and the skill control in response to the second trigger operation on the skill control of the target skill.

In some embodiments, during the foregoing casting operation, the user can change the skill casting target by changing the operation position of the trigger operation, and the final skill casting target of the target skill is determined by an end position of the casting operation. For example, the terminal obtains, in response to end of the casting operation on the target skill, the end position of the casting operation as the second operation position, the second operation position being in a first operation region, performs the position relationship between the second operation position and the skill control, and determines the skill casting target corresponding to the second operation position in the second virtual scene.

In the active casting method, there is a correspondence between the operation region of the skill control and the virtual scene, the operation on a certain position in the operation region is mapped to a corresponding position in the virtual scene, and the position relationship in the operation region may be mapped to the position relationship in the virtual scene.

In some embodiments, the skill casting target is any one of a skill casting position, a target virtual object, or a skill casting direction. In step 703, the process of determining the skill casting target according to the second operation position is implemented through the following step 1 to step 3.

Step 1. The terminal obtains a position relationship between the second operation position and the skill control.

Figure 12:
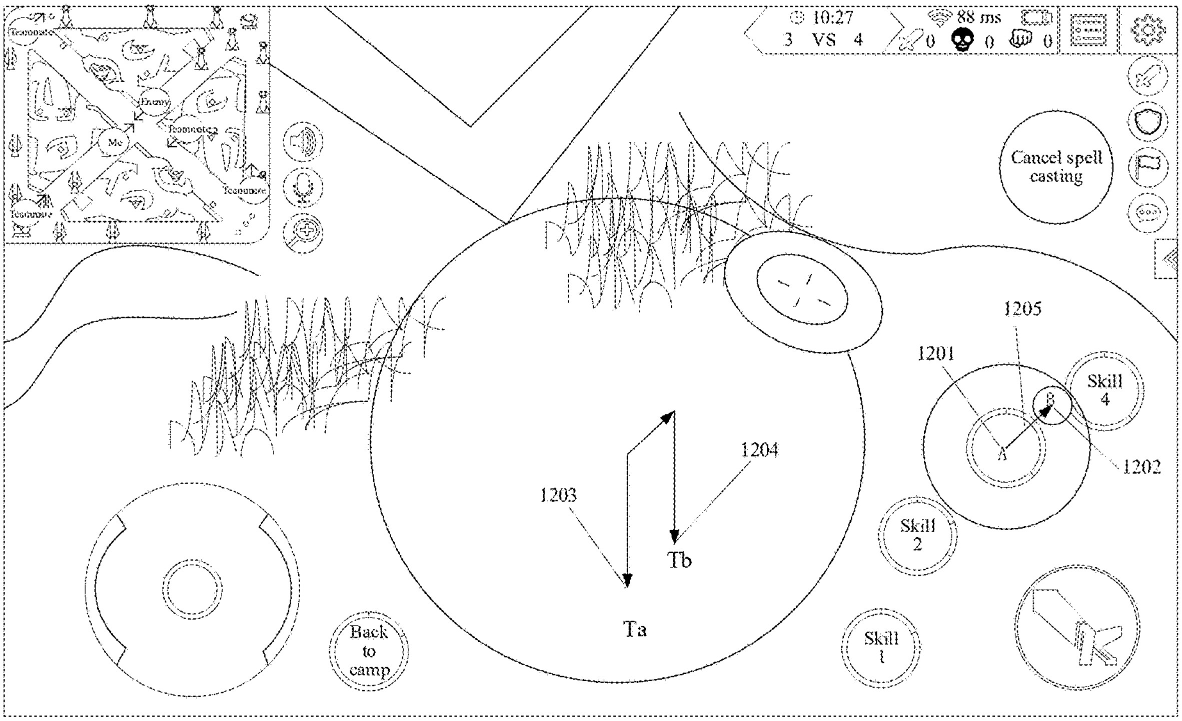
FIG. 12 is a schematic diagram of a terminal interface according to an embodiment of this disclosure.

In some embodiments, the position relationship is obtained according to the second operation position and a center position of the skill control. For example, the position relationship refers to a displacement and is expressed as a direction vector, and the direction vector points from the center position of the skill control to the second operation position. As shown in FIG. 12, assuming that the center position of the skill control 1201 is A and the second operation position 1202 is B, the position relationship is expressed as a vector B−A 1205 from A to B.

Step 2. The terminal converts the position relationship between the second operation position and the skill control according to a conversion relationship between an operation region of the skill control and a virtual scene, to obtain a target position relationship between a skill casting position and a center position of the second virtual scene.

There is a certain conversion relationship between the operation region of the skill and the virtual scene. The operation region is a 2D region, the virtual scene is a 3D virtual space, and sizes of the operation region and the virtual scene are not the same, so that there is mapping with a certain scaling ratio between the two.

Figure 13:
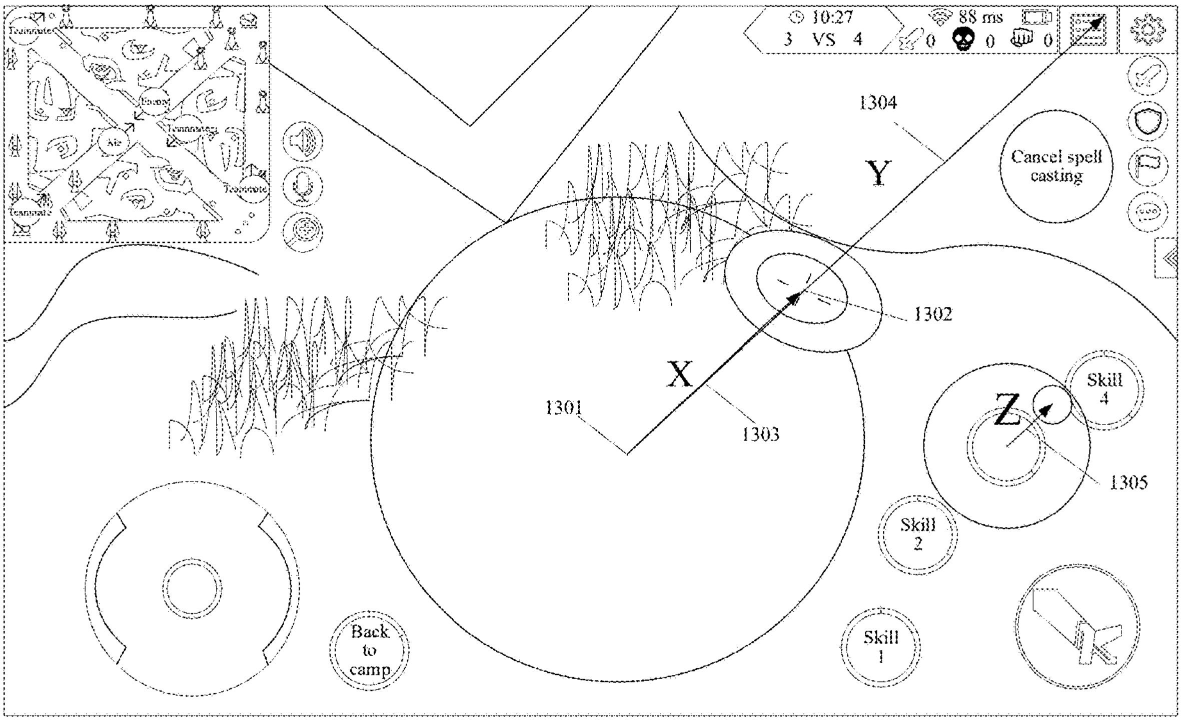
FIG. 13 is a schematic diagram of a terminal interface according to an embodiment of this disclosure.

The following describes the conversion relationship based on FIG. 13. Assuming that a line segment from the "minimap visual field center" 1301 to the point "A" 1302 is X 1303, a line segment extending to an edge of the screen in the direction from the "minimap visual field center" 1301 to the point "A" 1302 is Y 1304, and a line segment from the second operation position to the center position of the skill control is Z 1305, then the direction from the "minimap visual field center" 1301 to the point "A" 1302 is the same as the direction from the wheel center to the skill joystick, that is, "X is parallel to Z". The ratio of the length of the line segment X 1303 to the length of the line segment Y 1304 is equivalent to the ratio of the length of the line segment Z 1305 to the radius of the wheel, that is, X=(Z/radius of the wheel)*Y. Coordinates of the point "A" 1302 can be obtained based on the direction and length. Then a skill indicator is displayed on a position of the point "A" 1302 according to a rule.

Figure 14:
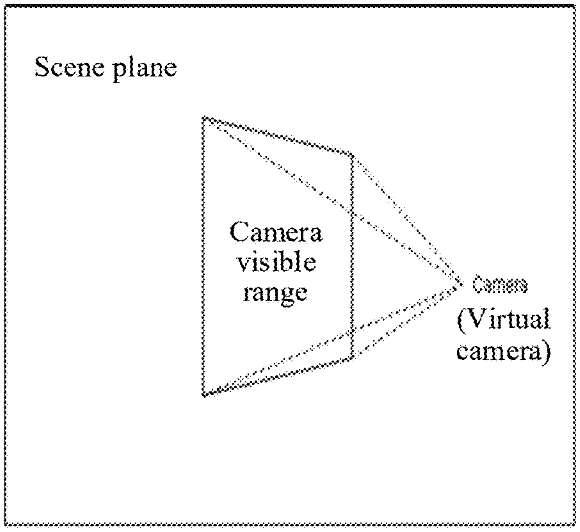
FIG. 14 is a schematic diagram of a position relationship between a virtual scene and a virtual camera according to an embodiment of this disclosure.

As shown in FIG. 14, the virtual scene is observed by using the virtual camera, and the observed region is actually a trapezoidal region. Assuming that the operation region is a round region, the conversion relationship is a mapping relationship used to convert the round region into an elliptical region or a mapping relationship used to convert the round region into a trapezoidal region. Which manner is specifically used is not limited in this embodiment of this disclosure.

In some embodiments, mapping relationship options may be provided, and the user selects a mapping relationship to be used from the mapping relationship options according to needs. The terminal performs the step 2 according to a target mapping relationship set in the mapping relationship options.

In some embodiments, the terminal determines an edge position of the second virtual scene according to the center position of the second virtual scene, and maps the position relationship between the second operation position and the skill control according to the center position of the second virtual scene, the edge position of the second virtual scene, and the size of the operation region.

Step 3. The terminal determines the skill casting position corresponding to the second operation position of the casting operation in the second virtual scene according to the center position of the second virtual scene and the target position relationship, and determines the skill casting position as the skill casting target, or determines a virtual object at the skill casting position as the target virtual object, or determines a direction of the skill casting position relative to the currently controlled first virtual object as the skill casting direction.

After the target position relationship is determined, the target position relationship being the position relationship of the skill casting position relative to the center position of the second virtual scene, the skill casting position may be obtained according to the center position and the target position relationship.

Figure 15:
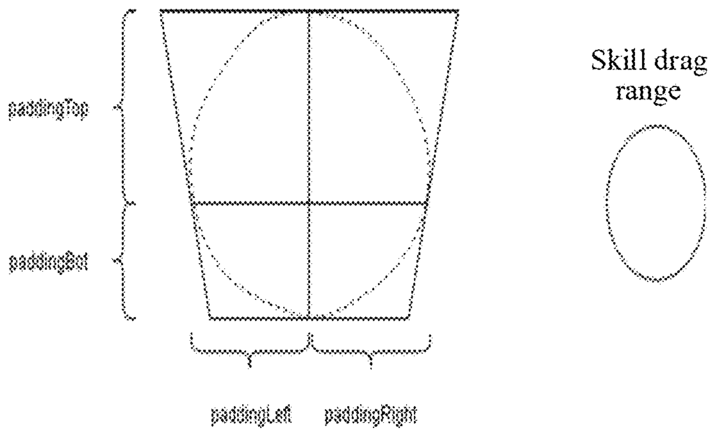
FIG. 15 is a diagram of a mapping relationship between an operation region and a virtual scene according to an embodiment of this disclosure.
Figure 16:
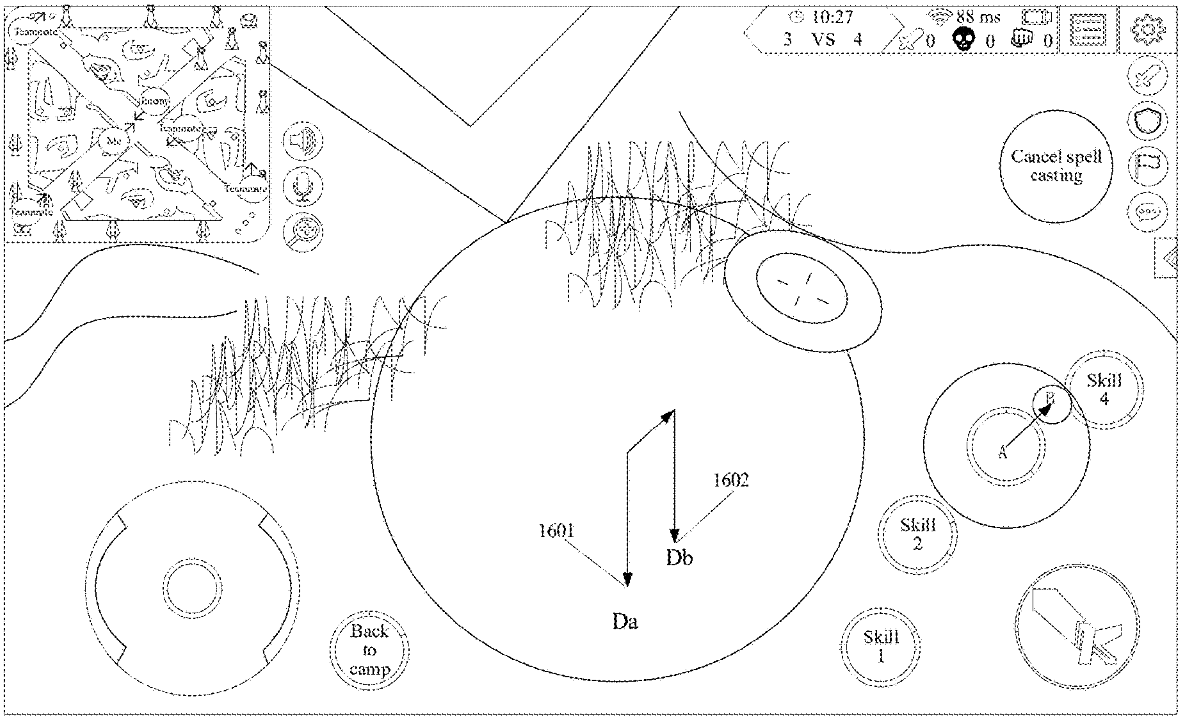
FIG. 16 is a schematic diagram of a terminal interface according to an embodiment of this disclosure.

The following describes the process of determining the skill casting position in the foregoing two conversion relationships. In the manner of the round region being mapped to the elliptical region, as shown in FIG. 15, the operation region may also be referred to as a skill drag range. In a first step, as shown in FIG. 12, the (B−A) vector 1205 on the UI is converted into the vector in the scene, the (B−A) vector 1205 is added to the screen center point Ta 1203 to obtain the point Tb 1204, and then the points Ta 1203 and Tb 1204 on the UI are converted into the points Da 1601 and Db 1602 in the scene in the manner of 2D to 3D, as shown in FIG. 16. Then, the corresponding direction vector AimDir in the virtual scene can be obtained, and AimDir-Normalize(Db−Da). Normalize is a normalization function.

In a second step, a distance between the scene position of the screen center point (AimCameraPos) and the screen edge can be calculated. To avoid dragging the skill casting position to the UI at the screen edge, the foregoing distance may be a distance excluding a border value. Specifically, four values may be set to respectively represent distances to the screen edge excluding the border value. For example, the four values are respectively paddingLeft, paddingRight, paddingTop, and paddingBot, respectively representing the distances between four sides on the left, right, top, and bottom of the screen and AimCameraPos (the scene position of the screen center point) in the scene. The process of obtaining the four values is the same, and the calculation of paddingTop is used as an example for description. First, AimCameraPos is converted into UICenterPos, that is, a 3D coordinate point is converted into a 2D coordinate point. Next, half of the height of the screen is added to UICenterPos, and the border value that needs to be excluded is subtracted, to obtain UITopPos. Then, UITopPos is converted into SceneTopPos in the 3D virtual scene. Finally, paddingTop can be obtained through (SceneTopPos-AimCameraPos).z. Other distances to the other sides can be obtained in the same manner.

In a third step, FocusPoint can be calculated according to AimCameraPos, AimDir, and a maximum value of each direction calculated in the foregoing steps by using a formula 6 and a formula 7.

$$\text{FocusPoint}.x=\text{AimCameraPos}.x+\text{AimDir}.x*(|B-A|/\text{AimMaxRadius})*(\text{AimDir}.x<0?\text{paddingLeft}:\text{paddingRight}) \quad \text{Formula 6:}$$

$$\text{FocusPoint}.z=\text{AimCameraPos}.z+\text{AimDir}.z*(|B-A|/\text{AimMaxRadius})*(\text{AimDir}.y<0?\text{papddingBot}:\text{paddingTop}) \quad \text{Formula 7:}$$

In the formula 6 and the formula 7, MaxAimRadius is a maximum aiming range of a skill button, |(B−A)| represents a drag distance of the skill button, FocusPoint is a skill casting position, AimCameraPos is a scene position of a screen center point in a second virtual scene, BorderLength is a border length between the screen center point and the screen edge, and AimDir is a direction vector corresponding to the vector (B−A) in the virtual scene. (AimDir.x<0 ?paddingLeft: paddingRight) indicates that, when AimDir.x<0 is met, paddingLeft is used, and when AimDir.x<0 is not met, paddingRight is used.

Figure 17:
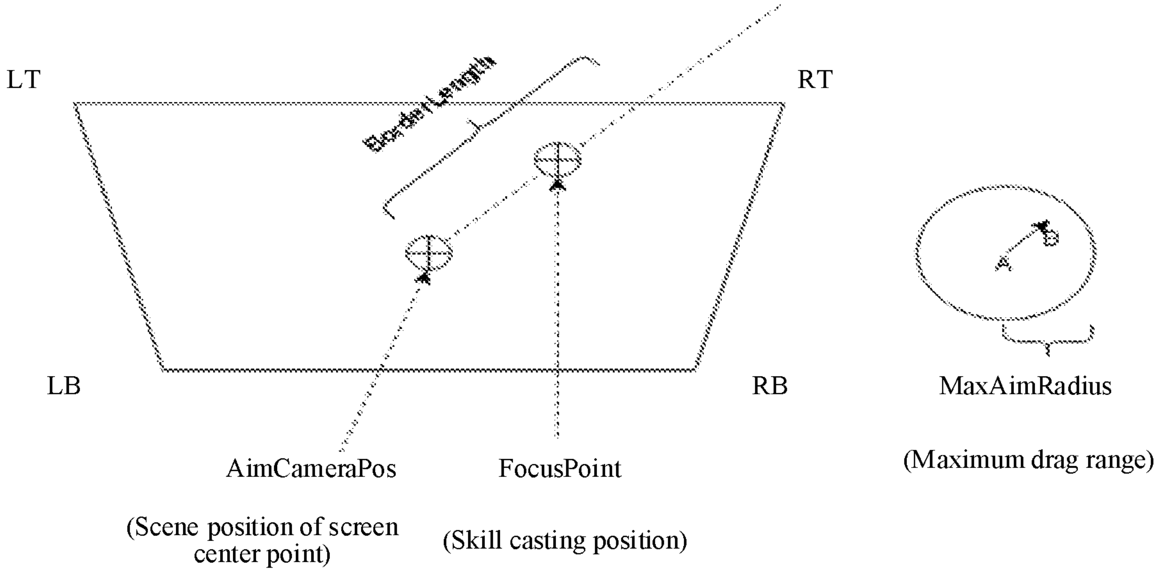
FIG. 17 is a diagram of a mapping relationship between an operation region and a virtual scene according to an embodiment of this disclosure.

In the manner of the round region being mapped to the trapezoidal region, as shown in FIG. 17, first, positions of four vertices in the trapezoidal range in the scene are calculated, respectively the left top point LT, the left bottom point LB, the right top point RT, and the right bottom point RB.

Then, an intersection point of AimCameraPos along AimDir and the trapezoid is determined according to the value of AimDir, which is relatively simple. For example, AimDir.x>0 && AimDir.y>0 needs to determine an intersection point of the AimDir facing ray of AimCameraPos and the (RT-LT) line segment, and then an intersection point of (RT-RB) with this ray is determined, the point that is closer to AimCameraPos among the two intersection points is the point used for the calculation, which can be determined by an intersection point formula of the line segments, and then the skill casting position is calculated by the following formula 8.

$$\text{FocusPoint}=\text{AimCameraPos}+(|(B-A)|/\text{MaxAimRadius})*\text{BorderLength}*\text{AimDir} \quad \text{Formula 8:}$$

In the formula 8, MaxAimRadius is a maximum aiming range of a skill button, |(B−A)| represents a drag distance of the skill button, FocusPoint is a skill casting position, AimCameraPos is a scene position of a screen center point in a second virtual scene, BorderLength is a border length between the screen center point and the screen edge, and AimDir is a direction vector corresponding to the vector (B−A) in the virtual scene.

The foregoing process is how to determine the skill casting position in the manner of active casting. If the process is in the manner of quick casting, in response to end of the casting operation on the target skill, and the second operation position when the casting operation ends being in the second operation region, the terminal determines, according to information about at least one second virtual object in the second virtual scene, a target virtual object from the at least one second virtual object, and determines the target virtual object as the skill casting target, or determines a position of the target virtual object as the skill casting target, or determines a direction of the target virtual object relative to the first virtual object as the skill casting target, the first operation region surrounding the second operation region.

Information that can be referred to in the process of determining, according to information about at least one second virtual object in the second virtual scene, a target virtual object from the at least one second virtual object may be different, such as a virtual health point or a distance to the first virtual object. This is not specifically limited in the embodiments of this disclosure. In some embodiments, the process of the terminal determining candidate casting target information of the skill according to information of at least one virtual object in the virtual scene may be implemented based on a casting target determining rule, and the casting target determining rule is used to determine the casting target, so that the casting target determining rule may also be referred to as a search rule. The casting target determining rule may be set by a person skilled in the art according to requirements, or may be set by the user according to a use habit of the user. This is not limited in this embodiment of this disclosure. For example, the terminal may select the target virtual object with the lowest health point in the enemy or teammates according to the information of at least one virtual object in the virtual scene. In another example, a virtual object closest to the currently controlled virtual object is used as the target virtual object. In another example, the virtual object with the highest priority is selected.

In the two methods of active casting and quick casting, the step of determining the skill casting target is performed based on the second operation position when the casting operation ends. That is, the step 703 may be as follows: the terminal determines the skill casting target corresponding to the second operation position in the second virtual scene according to the second operation position when the casting operation ends in response to the end of the casting operation on the target skill.

In some embodiments, during the casting operation, the terminal may also obtain and highlight the candidate skill casting target, so that the user can determine whether the candidate skill casting target meets expectations according to requirements. In some embodiments, the terminal may determine the candidate skill casting target corresponding to the second operation position in the second virtual scene according to the second operation position of the casting operation in response to the casting operation on the target skill, and highlight the candidate skill casting target in the second virtual scene. For example, as shown in FIG. 13, the candidate skill casting target may be highlighted. If the casting operation ends at this time, the highlighted candidate skill casting target may be used as the casting position corresponding to the second operation position.

In some embodiments, the target skill has a casting range, and the casting of the target skill cannot exceed the casting range. In this implementation, the terminal may determine a castable region of the target skill according to a position of the currently controlled first virtual object in the virtual scene and the casting range of the target skill. The castable region refers to a region where the skill can be cast, and the skill cannot be cast to a position outside the castable region. For example, some skills have a casting distance (that is, a castable range). A castable region can be determined according to the casting distance, and the skill cannot be cast to a position exceeding the casting distance and cannot be cast to a position outside the castable region.

After obtaining the castable region, the terminal may determine whether the currently selected casting position is within the castable region. In response to a position corresponding to the second operation position of the casting operation in the second virtual scene being within the castable region, the terminal may perform the step 703. Certainly, there is another possible case. In response to a position corresponding to the second operation position of the casting operation in the second virtual scene being outside the castable region, the terminal may determine the skill casting target corresponding to the second operation position in the virtual scene according to the second operation position of the casting operation and the position of the first virtual object in the virtual scene. Certainly, in the another possible case, the terminal may not perform the step of selecting the skill casting target, and cancel the casting of the target skill.

In step 704, the terminal controls a first virtual object to cast the target skill according to the skill casting target.

After determining the skill casting target, the terminal may control the first virtual object to cast the skill. For example, the target virtual object is determined as a second virtual object A, and the skill is to launch a fireball to the selected target. The casting effect displayed on the terminal may be: launching a fireball to the second virtual object A.

In some embodiments, the casting effect of the skill may be achieved through a casting animation of the skill. For example, in the step 704, the terminal may obtain a casting animation of the skill, and play the casting animation between the first virtual object and the target virtual object.

In this embodiment, the second virtual scene corresponding to the first operation position is displayed in the graphical user interface according to the first operation position of the first trigger operation on the map control. In this case, in response to the casting operation on the target skill, the skill casting target corresponding to the target skill in the currently displayed second virtual scene can be determined according to the second operation position of the casting operation, so as to cast the skill. In the foregoing method of controlling skill casting by using the map control, the corresponding second virtual scene can be displayed when the first trigger operation is performed on the map control. In this case, the selection range of the skill casting target may not be limited to the virtual scene with the virtual object as a center, the casting operation has a higher degree of freedom, and the selection can be accurately performed according to the case of a desired casting position when the skill is cast, rather than a rough estimation in the currently displayed virtual scene, improving the precision and accuracy of the virtual object control method.

Figure 18:
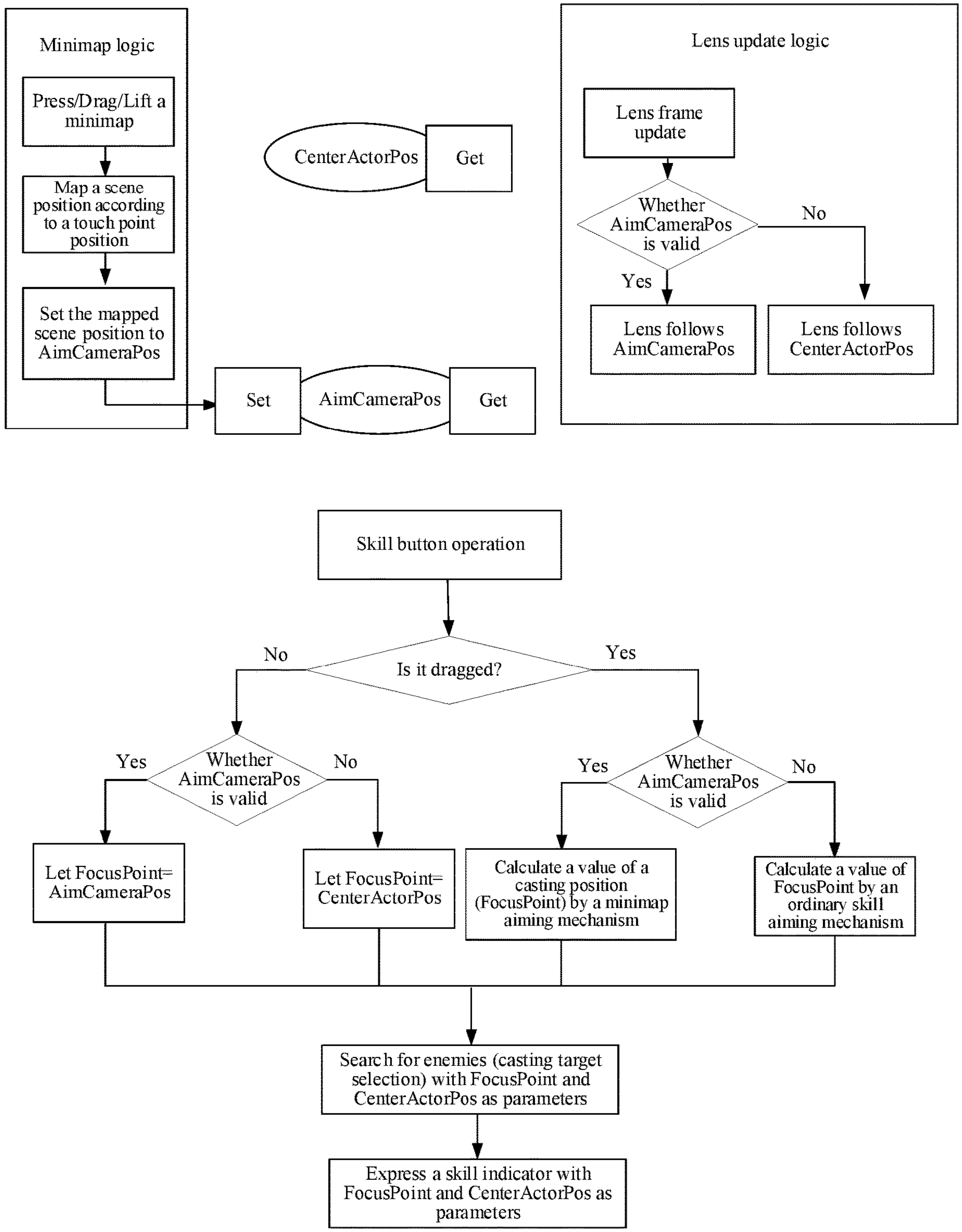
FIG. 18 is a flowchart of a virtual object control method according to an embodiment of this disclosure.

The following exemplarily describes the foregoing method procedure by using specific examples. As shown in FIG. 18, for the minimap (that is, the map control) logic, the user may perform operations on the minimap, for example, press/drag/lift operations. The terminal may map the scene position (that is, the position corresponding to the first operation position in the virtual scene) according to the touch point position (the first operation position). The terminal may set the mapped scene position to AimCameraPos. AimCameraPos may be subsequently obtained for subsequent logical calculations. If no operation is performed on the minimap, CenterActorPos (the position of the first virtual object) may be obtained for subsequent calculations.

The manner of triggering the skill after the operation on the minimap is referred to as a minimap aiming mechanism. The manner of triggering the skill without the operation on the minimap is referred to as an ordinary skill aiming mechanism. When the skill button is operated, it can be determined whether the skill button is dragged. If no, the method is quick casting; and if yes, the method is active casting. In the method of quick casting, it can be determined whether AimCameraPos (the scene position of the screen center point) is valid, that is, it can be determined whether there is an operation on the minimap. If there is no related operation on the minimap, then CenterActorPos of the hero (the first virtual object) controlled by the current player is directly assigned to FocusPoint (the skill casting position). If there is an operation on the minimap, then AimCameraPos is valid, and the value of AimCameraPos is assigned to FocusPoint. In the method of active casting, it can also be determined whether AimCameraPos is valid. If AimCameraPos is valid, FocusPoint is calculated by the minimap aiming mechanism. If AimCameraPos is invalid, FocusPoint is calculated by the ordinary skill aiming mechanism. After FocusPoint is calculated, steps similar to an ordinary skill casting logic may be specifically performed as follows:

1. Suitable skill targets are found by using the current position of the player ActorPos, the skill casting position FocusPoint, and the skill range as parameters.
2. A skill indicator is displayed by using ActorPos, FocusPoint, and the target found in the step 1 as parameters. The skill indicator is used to preview and display the skill target.

From the lens step, it can be seen that, when there is a drag on the minimap, AimCameraPos is the center point of the screen, and in the process of a quick click/tap, AimCameraPos is assigned to FocusPoint. In the skill process, different skill performance is shown according to different FocusPoint positions. The logic of the lens and skill using AimCameraPos as a basic point at the same time achieves an objective of "what you see is what you get" in operation.

For the ordinary skill aiming mechanism, in the solution without a drag on the minimap, FocusPoint can be obtained by using the following formula 9.

$$\text{FocusPoint}=H+\text{Normalize}(Db-Da)*(|B-A|*M) \quad \text{Formula 9:}$$

Figure 19:
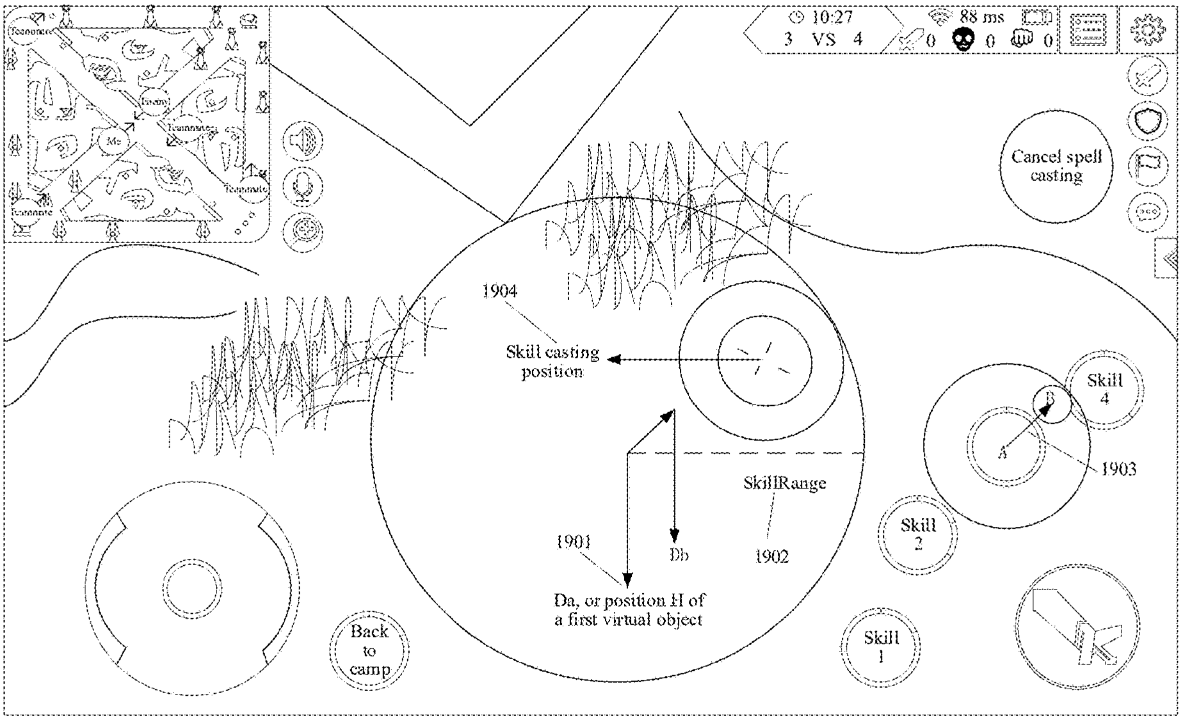
FIG. 19 is a schematic diagram of a terminal interface according to an embodiment of this disclosure.

The parameters in the formula 9 may be shown in FIG. 19. Assuming that the first virtual object is as a point H 1901, and the skill range is SkillRange 1902, the aiming vector (B−A) 1903 can be obtained in the UI layer. |B−A| is the length of (B−A), the point H is the current position of the first virtual object, Normalize(Db−Da) is the normalized vector of (Db−Da), FocusPoint 1904 is obtained through the foregoing formula 9, and M is the radius of the skill range.

For the lens update logic, when the lens frame is updated, it can be determined whether AimCameraPos is valid. If AimCameraPos is valid, the lens follows the screen center point AimCameraPos in the minimap; and if AimCameraPos is invalid, the lens follows the position of the first virtual object (CenterActorPos).

Figure 20:
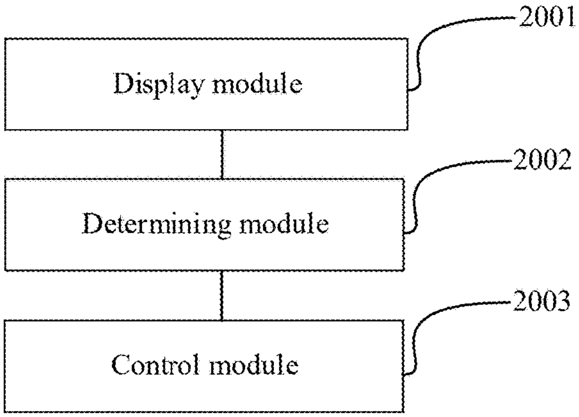
FIG. 20 is a schematic structural diagram of a virtual object control apparatus according to an embodiment of this disclosure.

FIG. 20 is a schematic structural diagram of a virtual object control apparatus according to an embodiment of this disclosure. The apparatus includes a display module, a determining module, and a control module. One or more modules of the apparatus can be implemented by processing circuitry, software, or a combination thereof, for example.

The display module 2001 is configured to switch, in response to a first trigger operation on a map control, according to a first operation position of the first trigger operation, a virtual scene displayed in a graphical user interface to a target virtual scene corresponding to the first operation position. In some embodiments, the display module 2001 is configured to display a first virtual scene, the first virtual scene displaying the map control, and display a second virtual scene corresponding to the first operation position in response to the first trigger operation on the map control, the first trigger operation acting on the first operation position.

The determining module 2002 is configured to determine, in response to a casting operation on a target skill, according to a second operation position of the casting operation, a skill casting target corresponding to the second operation position in the target virtual scene. In some embodiments, the determining module 2002 is configured to determine the corresponding skill casting target in the second virtual scene based on the second operation position in response to the casting operation on the target skill, the casting operation being corresponding to the second operation position.

The control module 2003 is configured to control a first virtual object to cast the target skill according to the skill casting target.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In some embodiments, the display module 2001 includes a first obtaining unit and a display unit.

The first obtaining unit is configured to obtain the target virtual scene corresponding to the first operation position according to the first operation position of the first trigger operation and a correspondence between display information in the map control and a virtual scene. In some embodiments, the first obtaining unit is configured to determine the second virtual scene corresponding to the first operation position according to the first operation position and the correspondence between the display information in the map control and the virtual scene.

The display unit is configured to switch the virtual scene displayed in the graphical user interface to the target virtual scene. In some embodiments, the display unit is configured to switch the first virtual scene to the second virtual scene.

In some embodiments, the first obtaining unit is configured to perform one of the following:

obtaining a target region with the first operation position as a center and a first target size as a size in the map control according to the first operation position of the first trigger operation, and obtaining the target virtual scene corresponding to the target region according to the correspondence between the region in the map control and the virtual scene; and obtaining a target position corresponding to the first operation position in the virtual scene and obtaining the target virtual scene with the target position as a center and a second target size as a size according to the first operation position and the correspondence between the position in the map control and the virtual scene.

In some embodiments, the first obtaining unit is configured to perform one of the following:

determining a target region with the first operation position as a center and a first target size as a size in the map control according to the first operation position of the first trigger operation, and determining the second virtual scene corresponding to the target region in the virtual scene according to the correspondence between the display information in the map control and the virtual scene; and determining a position corresponding to the first operation position in the virtual scene and determining the second virtual scene with the position as a center and a second target size as a size according to the first operation position and the correspondence between the display information in the map control and the virtual scene.

In some embodiments, the determining module 2002 is configured to determine, in response to a second trigger operation on a skill control of the target skill, according to a position relationship of the second operation position of the second trigger operation relative to the skill control, the skill casting target corresponding to the second operation position in the target virtual scene.

In some embodiments, the determining module 2002 is configured to determine, in response to a second trigger operation on a skill control of the target skill, according to a position relationship between the second operation position and the skill control, the skill casting target corresponding to the second operation position in the second virtual scene with an operation position of the second trigger operation as the second operation position.

In some embodiments, the skill casting target is any one of a skill casting position, a target virtual object, or a skill casting direction.

The determining module 2002 includes a second obtaining unit, a conversion unit, and a determining unit.

The second obtaining unit is configured to obtain the position relationship of the second operation position relative to the skill control.

The conversion unit is configured to convert the position relationship of the second operation position relative to the skill control according to a conversion relationship between an operation region of the skill control and a virtual scene, to obtain a target position relationship of a skill casting position relative to a center position of the target virtual scene.

The determining unit is configured to determine the skill casting position corresponding to the operation position of the casting operation in the target virtual scene according to the center position of the target virtual scene and the target position relationship, and determine the skill casting position as the skill casting target, or determine a virtual object at the skill casting position as the target virtual object, or determine a direction of the skill casting position relative to the currently controlled first virtual object as the skill casting direction.

In some embodiments, the second obtaining unit is configured to determine the position relationship between the second operation position and the skill control; the conversion unit is configured to convert the position relationship according to the conversion relationship between an operation region of the skill control and a virtual scene, to obtain the target position relationship between the skill casting position and the center position of the second virtual scene; and the determining unit is configured to determine the skill casting position corresponding to the second operation position in the second virtual scene according to the center position of the second virtual scene and the target position relationship, and determine the skill casting position as the skill casting target, or determine a virtual object at the skill casting position as the target virtual object, or determine a direction of the skill casting position relative to the currently controlled first virtual object as the skill casting direction.

In some embodiments, the conversion unit is configured to determine an edge position of the target virtual scene according to the center position of the target virtual scene, and convert the position relationship of the second operation position relative to the skill control according to the center position of the target virtual scene, the edge position of the target virtual scene, and the size of the operation region.

In some embodiments, the conversion unit is configured to determine an edge position of the second virtual scene according to the center position of the second virtual scene, and convert the position relationship between the second operation position and the skill control according to the center position of the second virtual scene, the edge position of the second virtual scene, and the size of the operation region.

In some embodiments, the determining module 2002 is configured to, in response to end of the casting operation on the target skill, and the second operation position when the casting operation ends being in the first operation region, perform the position relationship of the second operation position of the second trigger operation relative to the skill control, and determine the skill casting target corresponding to the second operation position in the target virtual scene.

In some embodiments, the determining module 2002 is configured to, in response to end of the casting operation on the target skill, with an end position of the casting operation as the second operation position, and the second operation position being in a first operation region, perform the position relationship between the second operation position and the skill control, and determine the skill casting target corresponding to the second operation position in the second virtual scene.

In some embodiments, the determining module 2002 is configured to, in response to end of the casting operation on the target skill, and the second operation position when the casting operation ends being in the second operation region, determine, according to information about at least one second virtual object in the target virtual scene, a target virtual object from the at least one second virtual object, and determine the target virtual object as the skill casting target, or determine a position of the target virtual object as the skill casting target, or determine a direction of the target virtual object relative to the first virtual object as the skill casting target, the first operation region surrounding the second operation region.

In some embodiments, the determining module 2002 is configured to, in response to end of the casting operation on the target skill, with an end position of the casting operation as the second operation position, and the second operation position being in a second operation region, determine, according to information about at least one second virtual object in the second virtual scene, a target virtual object from the at least one second virtual object, and determine the target virtual object as the skill casting target, or determine a position of the target virtual object as the skill casting target, or determine a direction of the target virtual object relative to the first virtual object as the skill casting target, the first operation region surrounding the second operation region.

In some embodiments, the determining module 2002 is configured to determine, in response to end of a casting operation on a target skill, according to a second operation position when the casting operation ends, a skill casting target corresponding to the second operation position in the target virtual scene.

In some embodiments, the determining module 2002 is configured to, in response to end of the casting operation on the target skill, with an end position of the casting operation as the second operation position, determine the skill casting target corresponding to the second operation position in the second virtual scene.

In some embodiments, the determining module 2002 is further configured to determine the candidate skill casting target corresponding to the second operation position in the target virtual scene according to the second operation position of the casting operation in response to the casting operation on the target skill; and the display module 2001 is further configured to highlight the candidate skill casting target in the target virtual scene.

In some embodiments, the determining module 2002 is further configured to determine a candidate skill casting target in the second virtual scene according to a real-time operation position of the casting operation in response to implementation of the casting operation on the target skill.

The display module 2001 is further configured to highlight the candidate skill casting target in the second virtual scene.

In some embodiments, the determining module 2002 is configured to: determine a castable region of the target skill according to a position of the currently controlled first virtual object in a virtual scene and a casting range of the target skill; and perform the step of determining the skill casting target corresponding to the second operation position in the target virtual scene according to the second operation position of the casting operation in response to a position corresponding to the second operation position of the casting operation in the target virtual scene being in the castable region.

In some embodiments, the determining module 2002 is configured to: determine a castable region of the target skill according to a position of the currently controlled first virtual object in a virtual scene and a casting range of the target skill; and perform the step of determining the skill casting target corresponding to the second operation position in the second virtual scene in response to a position corresponding to the second operation position in the second virtual scene being in the castable region.

In some embodiments, the determining module 2002 is further configured to determine, in response to a position corresponding to the second operation position of the casting operation in the target virtual scene being outside the castable region, the skill casting target corresponding to the second operation position in the virtual scene according to the second operation position of the casting operation and the position of the first virtual object in the virtual scene.

In some embodiments, the determining module 2002 is further configured to determine, according to the second operation position and a position of the first virtual object in a virtual scene, the skill casting target corresponding to the second operation position in the virtual scene in response to a target position being outside the castable region, the target position being a position corresponding to the second operation position in the second virtual scene.

In the apparatus provided by the embodiments of this disclosure, the target virtual scene corresponding to the first operation position is displayed in the graphical user interface according to the first operation position of the first trigger operation on the map control. In this case, in response to the casting operation on the target skill, the skill casting target corresponding to the target skill in the currently displayed target virtual scene can be determined according to the second operation position corresponding to the casting operation, so as to cast the skill. In the foregoing method of controlling skill casting by using the map control, the corresponding target virtual scene can be displayed when the first trigger operation is performed on the map control. In this case, the selection range of the skill casting target may not be limited to the virtual scene with the virtual object as a center, the casting operation has a higher degree of freedom, and the selection can be accurately performed according to the case of a desired casting position when the skill is cast, rather than a rough estimation in the currently displayed virtual scene, improving the precision and accuracy of the virtual object control method.

When the virtual object control apparatus provided in the foregoing embodiments controls the virtual object, only division of the foregoing functional modules is used as an example for description. In the practical application, the functions may be allocated to and completed by different functional modules according to requirements. That is, an internal structure of an electronic device is divided into different functional modules, to complete all or some of the functions described above. In addition, the virtual object control apparatus and the virtual object control method provided in the foregoing embodiments belong to the same concept. For a specific implementation process, refer to the embodiments of the virtual object control method, and details are not described herein again.

Figure 21:
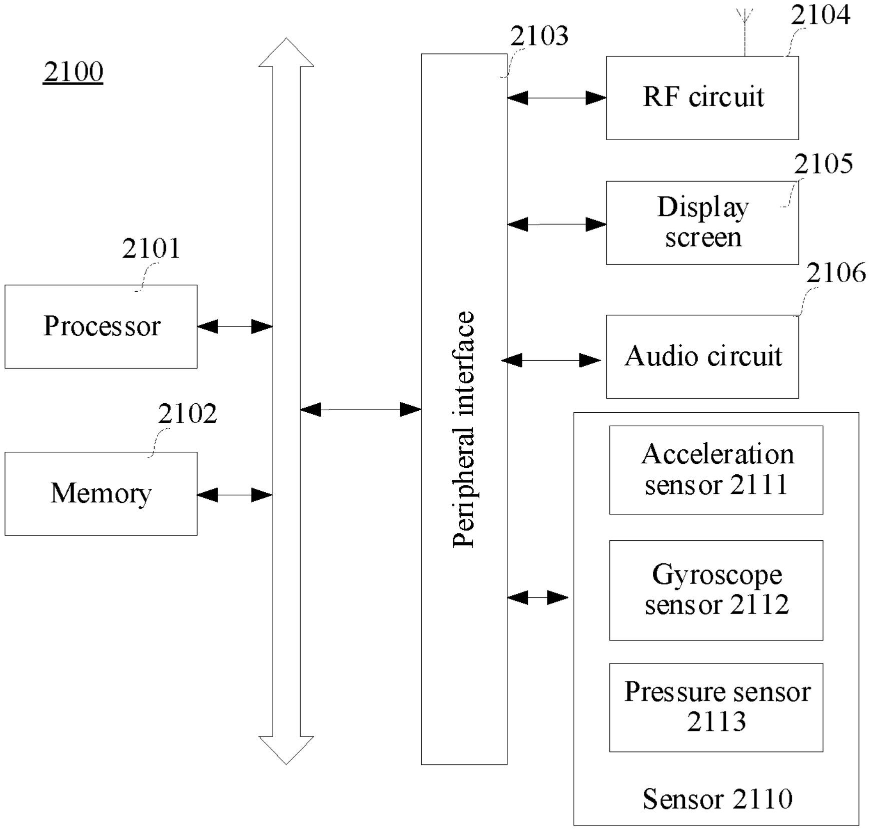
FIG. 21 is a schematic structural diagram of a terminal 2100 according to an embodiment of this disclosure.

The electronic device may be provided as a terminal shown in FIG. 21.

FIG. 21 is a schematic structural diagram of a terminal 2100 according to an embodiment of this disclosure. The terminal 2100 may be a smartphone, a tablet computer, an MP3 player, an MP4 player, a notebook computer, or a desktop computer. The terminal 2100 may also be referred to as a user equipment, a portable terminal, a laptop terminal, a desktop terminal, or the like.

Generally, the terminal 2100 includes a processor 2101 and a memory 2102.

The processor 2101 may include one or more processing cores, for example, a 4-core processor or an 8-core processor. The processor 2101 may be implemented by using at least one hardware form of a digital signal processor (DSP), a field-programmable gate array (FPGA), and a programmable logic array (PLA). The processor 2101 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 2101 may be integrated with a graphics processing unit (GPU). The GPU is configured to be responsible for rendering and drawing content that a display needs to display. In some embodiments, the processor 2101 may further include an AI processor. The AI processor is configured to process a computing operation related to machine learning.

The memory 2102 may include one or more computer-readable storage media. The computer-readable storage media may be non-transitory. The memory 2102 may further include a high-speed random access memory and a nonvolatile memory, for example, one or more disk storage devices or flash storage devices. In some embodiments, the non-transient computer-readable storage medium in the memory 2102 is configured to store at least one instruction. The at least one instruction is executed by the processor 2101 to perform the method steps on a terminal side in the virtual object control method provided in the embodiments of this disclosure.

In some embodiments, the terminal 2100 may include: a peripheral interface 2103 and at least one peripheral. The processor 2101, the memory 2102, and the peripheral interface 2103 may be connected by using a bus or a signal cable. Each peripheral may be connected to the peripheral interface 2103 by using a bus, a signal cable, or a circuit board. In some embodiments, the peripheral includes: at least one of a radio frequency (RF) circuit 2104, a touch display screen 2105, and an audio circuit 2106.

The peripheral interface 2103 may be configured to connect the at least one peripheral related to input/output (I/O) to the processor 2101 and the memory 2102. In some embodiments, the processor 2101, the memory 2102, and the peripheral interface 2103 are integrated on the same chip or circuit board. In some other embodiments, any one or two of the processor 2101, the memory 2102, and the peripheral interface 2103 may be implemented on an independent chip or circuit board. This is not limited in this embodiment.

The display screen 2105 is configured to display a user interface (UI). The UI may include a graph, text, an icon, a video, and any combination thereof. When the display screen 2105 is a touch display screen, the display screen 2105 is further capable of collecting touch signals on or above a surface of the display screen 2105. The touch signal may be inputted, as a control signal, to the processor 2101 for processing. In this case, the display screen 2105 may be further configured to provide a virtual button and/or a virtual keyboard that are/is also referred to as a soft button and/or a soft keyboard. In some embodiments, there may be one display screen 2105 disposed on a front panel of the terminal 2100. In some other embodiments, there may be at least two display screens 2105 respectively disposed on different surfaces of the terminal 2100 or designed in a foldable shape. In still some other embodiments, the display screen 2105 may be a flexible display screen, disposed on a curved surface or a folded surface of the terminal 2100. Even, the display screen 2105 may be further set to have a non-rectangular irregular pattern, that is, a special-shaped screen. The display screen 2105 may be prepared by using materials such as a liquid crystal display (LCD), an organic light-emitting diode (OLED), or the like.

The audio circuit 2106 may include a microphone and a speaker. The microphone is configured to collect sound waves of users and surroundings, and convert the sound waves into electrical signals and input the signals to the processor 2101 for processing, or input the signals to the RF circuit 2104 to implement voice communication. For the purpose of stereo collection or noise reduction, there may be a plurality of microphones, respectively disposed at different portions of the terminal 2100. The microphone may be further an array microphone or an omni-directional collection type microphone. The speaker is configured to convert electric signals from the processor 2101 or the RF circuit 2104 into sound waves. The speaker may be a thin-film speaker or a piezoelectric ceramic speaker. When the speaker is the piezoelectric ceramic speaker, the speaker can not only convert electrical signals into sound waves audible to a human being, but also convert electrical signals into sound waves inaudible to the human being for ranging and other purposes. In some embodiments, the audio circuit 2106 may also include an earphone jack.

In some embodiments, the terminal 2100 further includes one or more sensors 2110. The one or more sensors 2110 include, but are not limited to: an acceleration sensor 2111, a gyroscope sensor 2112, and a pressure sensor 2113.

The acceleration sensor 2111 may detect the magnitude of acceleration on three coordinate axes of a coordinate system established by the terminal 2100. For example, the acceleration sensor 2111 may be configured to detect components of gravity acceleration on the three coordinate axes. The processor 2101 may control, according to a gravity acceleration signal collected by the acceleration sensor 2111, the touch display screen 2105 to display the UI in a landscape view or a portrait view. The acceleration sensor 2111 may be further configured to collect motion data of a game or a user.

The gyroscope sensor 2112 may detect a body direction and a rotation angle of the terminal 2100, and the gyroscope sensor 2112 may work with the acceleration sensor 2111 to collect a 3D action performed by the user on the terminal 2100. The processor 2101 may implement the following functions according to the data collected by the gyroscope sensor 2112: motion sensing (for example, changing the UI according to a tilt operation of the user), image stabilization during shooting, game control, and inertial navigation.

The pressure sensor 2113 may be disposed on a side frame of the terminal 2100 and/or a lower layer of the touch display screen 2105. When the pressure sensor 2113 is disposed on the side frame of the terminal 2100, a holding signal of the user on the terminal 2100 may be detected. The processor 2101 performs left and right hand recognition or a quick operation according to the holding signal collected by the pressure sensor 2113. When the pressure sensor 2113 is disposed on the lower layer of the touch display screen 2105, the processor 2101 controls, according to a pressure operation of the user on the touch display screen 2105, an operable control on the UI. The operable control includes at least one of a button control, a scroll-bar control, an icon control, and a menu control.

A person skilled in the art may understand that the structure shown in FIG. 21 does not constitute a limitation to the terminal 2100, and the terminal may include more or fewer components than those shown in the figure, or some components may be combined, or a different component deployment may be used.

In some embodiments, the at least one instruction is executed by a processor to implement the following method steps: determining the second virtual scene corresponding to the first operation position according to the first operation position and a correspondence between display information in the map control and a virtual scene; and switching the first virtual scene to the second virtual scene.

In some embodiments, the at least one instruction is executed by a processor to implement any one of the following steps: (1) determining a target region with the first operation position as a center and a first target size as a size in the map control according to the first operation position of the first trigger operation, and determining the second virtual scene corresponding to the target region in the virtual scene according to the correspondence between the display information in the map control and the virtual scene; and (2) determining a position corresponding to the first operation position in the virtual scene and determining the second virtual scene with the position as a center and a second target size as a size according to the first operation position and the correspondence between the display information in the map control and the virtual scene.

In some embodiments, the at least one instruction is executed by a processor to implement the following method steps: determining, in response to a second trigger operation on a skill control of the target skill, the skill casting target corresponding to the second operation position in the second virtual scene with an operation position of the second trigger operation as the second operation position according to a position relationship between the second operation position and the skill control.

In some embodiments, the at least one instruction is executed by a processor to implement that: the determining the skill casting target corresponding to the second operation position in the second virtual scene according to a position relationship between the second operation position and the skill control further includes: (1) determining the position relationship between the second operation position and the skill control; (2) converting the position relationship according to a conversion relationship between an operation region of the skill control and a virtual scene, to obtain a target position relationship between the skill casting position and a center position of the second virtual scene; and (3) determining the skill casting position corresponding to the second operation position in the second virtual scene according to the center position of the second virtual scene and the target position relationship, and determining the skill casting position as the skill casting target, or determining a virtual object at the skill casting position as the target virtual object, or determining a direction of the skill casting position relative to the currently controlled first virtual object as the skill casting direction.

In some embodiments, the at least one instruction is executed by a processor to implement the following method steps: (1) determining an edge position of the second virtual scene according to the center position of the second virtual scene; and (2) converting the position relationship between the second operation position and the skill control according to the center position of the second virtual scene, the edge position of the second virtual scene, and a size of the operation region.

In some embodiments, the at least one instruction is executed by a processor to implement the following method steps: in response to end of the casting operation on the target skill, with an end position of the casting operation as the second operation position, and the second operation position being in a first operation region, performing the position relationship between the second operation position and the skill control, and determining the skill casting target corresponding to the second operation position in the second virtual scene.

In some embodiments, the at least one instruction is executed by a processor to implement the following method steps: in response to end of the casting operation on the target skill, with an end position of the casting operation as the second operation position, and the second operation position being in a second operation region, determining, according to information about at least one second virtual object in the second virtual scene, a target virtual object from the at least one second virtual object, and determining the target virtual object as the skill casting target, or determining a position of the target virtual object as the skill casting target, or determining a direction of the target virtual object relative to the first virtual object as the skill casting target, the first operation region surrounding the second operation region.

In some embodiments, the at least one instruction is used to be executed by a processor (processing circuitry) to implement the following method steps: in response to end of the casting operation on the target skill, with an end position of the casting operation as the second operation position, determining the skill casting target corresponding to the second operation position in the second virtual scene.

In some embodiments, the at least one instruction is used to be executed by a processor (processing circuitry) to implement the following method steps: (1) determining a candidate skill casting target in the second virtual scene according to a real-time operation position of the casting operation in response to implementation of the casting operation on the target skill; and (2) highlighting the candidate skill casting target in the second virtual scene.

In some embodiments, the at least one instruction is used to be executed by a processor to implement the following method steps: (1) determining a castable region of the target skill according to a position of the currently controlled first virtual object in a virtual scene and a casting range of the target skill; and (2) performing the operation of determining the skill casting target corresponding to the second operation position in the second virtual scene in response to a position corresponding to the second operation position in the second virtual scene being in the castable region.

In some embodiments, the at least one instruction is used to be executed by a processor to implement the following method steps: determining, according to the second operation position and a position of the first virtual object in a virtual scene, the skill casting target corresponding to the second operation position in the virtual scene in response to a target position being outside the castable region, the target position being a position corresponding to the second operation position in the second virtual scene.

In an exemplary embodiment, a non-transitory computer-readable storage medium, for example, a memory including at least one program code is further provided. The at least one program code may be executed by a processor in an electronic device to implement the virtual object control method in the foregoing embodiments. For example, the computer-readable storage medium may be a read-only memory (ROM), a RAM, a compact disc read-only memory (CD-ROM), a magnetic tape, a floppy disk, an optical data storage device, or the like.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are different embodiments of this disclosure, but are not intended to limit this disclosure. Any modification, equivalent replacement, or improvement made within the spirit and principle of this disclosure shall fall within the protection scope of this disclosure.

The invention claimed is:

1. A virtual object control method, comprising:

displaying a first virtual scene including a first virtual object, the first virtual scene including a map control;

displaying a second virtual scene corresponding to a first operation position, in response to a first trigger operation on the map control, the first trigger operation acting on the first operation position;

determining a center position of the second virtual scene based on the first operation position, the center position defining a targeting reference independent of a position of the first virtual object;

determining a skill casting target in the second virtual scene based on a second operation position that is determined based on a position of a skill control element of a target skill relative to the center position of the second virtual scene, in response to a casting operation on the skill control element of the target skill, the casting operation corresponding to the second operation position; and controlling the first virtual object located in the first virtual scene to cast the target skill from the first virtual scene according to the determined skill casting target in the second virtual scene.

2. The method according to claim 1, wherein the displaying the second virtual scene corresponding to the first operation position further comprises:

determining the second virtual scene corresponding to the first operation position according to the first operation position and a correspondence between display information in the map control and a virtual environment; and switching the first virtual scene to the second virtual scene.

3. The method according to claim 2, wherein the determining the second virtual scene further comprises one of:

determining a target region with the first operation position as a center and a first target size as a size in the map control according to the first operation position of the first trigger operation, and determining the second virtual scene corresponding to the target region in the virtual environment according to the correspondence between the display information in the map control and the virtual environment; and determining a position corresponding to the first operation position in the virtual environment and determining the second virtual scene with the position as a center and a second target size as a size according to the first operation position and the correspondence between the display information in the map control and the virtual environment.

4. The method according to claim 1, wherein the determining the skill casting target further comprises:

determining, in response to a second trigger operation on the skill control element of the target skill, the skill casting target corresponding to the second operation position in the second virtual scene with an operation position of the second trigger operation as the second operation position according to a position relationship between the second operation position and the skill control element.

5. The method according to claim 4, wherein the determined skill casting target is one of a skill casting position, a target virtual object, and a skill casting direction; and the determining the skill casting target corresponding to the second operation position in the second virtual scene further comprises:

determining the position relationship between the second operation position and the skill control element;

converting the position relationship according to a conversion relationship between an operation region of the skill control element and a virtual environment, to obtain a target position relationship between the skill casting position and the center position of the second virtual scene; and determining the skill casting position corresponding to the second operation position in the second virtual scene according to the center position of the second virtual scene and the target position relationship and determining the skill casting position as the skill casting target, determining a virtual object at the skill casting position as the target virtual object, or determining a direction of the skill casting position relative to the controlled first virtual object as the skill casting direction.

6. The method according to claim 5, wherein the converting further comprises:

determining an edge position of the second virtual scene according to the center position of the second virtual scene; and converting the position relationship between the second operation position and the skill control element according to the center position of the second virtual scene, the edge position of the second virtual scene, and a size of the operation region.

7. The method according to claim 4, wherein the determining the skill casting target corresponding to the second operation position in the second virtual scene further comprises:

in response to an end of the casting operation on the target skill, with an end position of the casting operation as the second operation position, and the second operation position being in a first operation region, determining the position relationship between the second operation position and the skill control element, and determining the skill casting target corresponding to the second operation position in the second virtual scene.

8. The method according to claim 1, wherein the determining the skill casting target further comprises:

in response to an end of the casting operation on the target skill, with an end position of the casting operation as the second operation position, and the second operation position being in a second operation region, determining, according to information about at least one second virtual object in the second virtual scene, a target virtual object from the at least one second virtual object, and determining the target virtual object as the skill casting target, or determining a position of the target virtual object as the skill casting target, or determining a direction of the target virtual object relative to the first virtual object as the skill casting target, a first operation region surrounding the second operation region.

9. The method according to claim 1, wherein the determining the skill casting target further comprises:

in response to an end of the casting operation on the target skill, with an end position of the casting operation as the second operation position, determining the skill casting target corresponding to the second operation position in the second virtual scene.

10. The method according to claim 1, further comprising:

determining a candidate skill casting target in the second virtual scene according to a real-time operation position of the casting operation in response to implementation of the casting operation on the target skill; and highlighting the determined candidate skill casting target in the second virtual scene.

11. The method according to claim 1, wherein the determining the skill casting target further comprises:

determining a castable region of the target skill according to a position of the controlled first virtual object in a virtual environment and a casting range of the target skill; and performing the operation of determining the skill casting target corresponding to the second operation position in the second virtual scene in response to a position corresponding to the second operation position in the second virtual scene being in the determined castable region.

12. The method according to claim 11, further comprising:

determining, according to the second operation position and a position of the first virtual object in the virtual environment, the skill casting target corresponding to the second operation position in the virtual environment, in response to a target position being outside the castable region, the target position being a position corresponding to the second operation position in the second virtual scene.

13. An electronic device, comprising processing circuitry and one or more memories, the one or more memories storing at least one program code, the at least one program code being loaded and executed by the processing circuitry to implement the operations performed in the virtual object control method according to claim 1.

14. A virtual object control apparatus, comprising:

circuitry configured to cause a first virtual scene including a first virtual object to be displayed, the first virtual scene including a map control;

cause a second virtual scene corresponding to a first operation position to be displayed in response to a first trigger operation on the map control, the first trigger operation acting on the first operation position;

determine a center position of the second virtual scene based on the first operation position, the center position defining a targeting reference independent of a position of the first virtual object;

determine a skill casting target in the second virtual scene based on a second operation position that is determined based on a position of a skill control element of a target skill relative to the center position of the second virtual scene, in response to a casting operation on the skill control element of the target skill, the casting operation corresponding to the second operation position; and control the first virtual object located in the first virtual scene to cast the target skill from the first virtual scene according to the determined skill casting target in the second virtual scene.

15. The virtual object control apparatus of claim 14, wherein the circuitry, in displaying the second virtual scene corresponding to the first operation position, is further configured to:

determine the second virtual scene corresponding to the first operation position according to the first operation position and a correspondence between display information in the map control and a virtual environment; and switch the first virtual scene to the second virtual scene.

16. The virtual object control apparatus of claim 15, wherein the circuitry, in determining the second virtual scene, is further configured to one of:

determine a target region with the first operation position as a center and a first target size as a size in the map control according to the first operation position of the first trigger operation, and determine the second virtual scene corresponding to the target region in the virtual environment according to the correspondence between the display information in the map control and the virtual environment; and determine a position corresponding to the first operation position in the virtual environment and determine the second virtual scene with the position as a center and a second target size as a size according to the first operation position and the correspondence between the display information in the map control and the virtual environment.

17. The virtual object control apparatus of claim 14, wherein the circuitry, in determining the skill casting target, is further configured to:

determine, in response to a second trigger operation on the skill control element of the target skill, the skill casting target corresponding to the second operation position in the second virtual scene with an operation position of the second trigger operation as the second operation position according to a position relationship between the second operation position and the skill control element.

18. The virtual object control apparatus of claim 17, wherein the determined skill casting target is one of a skill casting position, a target virtual object, and a skill casting direction; and the circuitry, in determining the skill casting target corresponding to the second operation position in the second virtual scene, is further configured to:

determine the position relationship between the second operation position and the skill control element;

convert the position relationship according to a conversion relationship between an operation region of the skill control element and a virtual environment, to obtain a target position relationship between the skill casting position and the center position of the second virtual scene; and determine the skill casting position corresponding to the second operation position in the second virtual scene according to the center position of the second virtual scene and the target position relationship, and determine the skill casting position as the skill casting target, determine a virtual object at the skill casting position as the target virtual object, or determine a direction of the skill casting position relative to the controlled first virtual object as the skill casting direction.

19. The virtual object control apparatus of claim 18, wherein the circuitry, in converting the positional relationship, is further configured to:

determine an edge position of the second virtual scene according to the center position of the second virtual scene; and convert the position relationship between the second operation position and the skill control element according to the center position of the second virtual scene, the edge position of the second virtual scene, and a size of the operation region.

20. A non-transitory storage medium, storing at least one program code, the at least one program code when executed by processing circuitry cause the processing circuitry to perform:

displaying a first virtual scene including a first virtual object, the first virtual scene including a map control;

displaying a second virtual scene corresponding to a first operation position, in response to a first trigger operation on the map control, the first trigger operation acting on the first operation position;

determining a center position of the second virtual scene based on the first operation position, the center position defining a targeting reference independent of a position of the first virtual object;

determining a skill casting target in the second virtual scene based on a second operation position that is determined based on a position of a skill control element of a target skill relative to the center position of the second virtual scene, in response to a casting operation on the skill control element of the target skill, the casting operation corresponding to the second operation position; and controlling the first virtual object located in the first virtual scene to cast the target skill from the first virtual scene according to the determined skill casting target in the second virtual scene.

* * * * *